US012673417B2

(12) United States Patent
Di Carlo et al.

(10) Patent No.: US 12,673,417 B2
(45) Date of Patent: Jul. 7, 2026

(54) OBJECT CLIMBING BY LEGGED ROBOTS USING TRAINING OBJECTS

(71) Applicant: Boston Dynamics, Inc., Waltham, MA (US)

(72) Inventors: Jared Di Carlo, Lincoln, MA (US); Kevin Bergamin, Waltham, MA (US); Carmine Dario Bellicoso, Boston, MA (US); Scott Kuindersma, Bedford, MA (US)

(73) Assignee: Boston Dynamics, Inc., Waltham, MA (US)

( * ) Notice: Subject to any disclaimer, the term of this patent is extended or adjusted under 35 U.S.C. 154(b) by 22 days.

(21) Appl. No.: 18/537,269

(22) Filed: Dec. 12, 2023

(65) Prior Publication Data

US 2024/0189989 A1     Jun. 13, 2024

Related U.S. Application Data

(60) Provisional application No. 63/387,208, filed on Dec. 13, 2022.

(51) Int. Cl.
  *B25J 9/16*       (2006.01)
  *B62D 57/032*     (2006.01)
(52) U.S. Cl.
  CPC ............. *B25J 9/161* (2013.01); *B25J 9/1664* (2013.01); *B25J 9/1694* (2013.01); *B62D 57/032* (2013.01)
(58) Field of Classification Search
  USPC .................................................. 700/245–264
  See application file for complete search history.

(56) References Cited

U.S. PATENT DOCUMENTS 7,177,737 B2   2/2007  Karlsson et al.
7,774,158 B2   8/2010  Domingues Goncalves et al.
          (Continued)

FOREIGN PATENT DOCUMENTS

CN      116802021 A    9/2023
DE   102018101388 A1   7/2019
          (Continued)

OTHER PUBLICATIONS

"Advanced Skills by Learning Locomotion and Local Navigation End-to-End," video screen shots taken from https://www.youtube.com/watch?v=Xoe8a_2t24U, Sep. 27, 2022, downloaded Mar. 13, 2024, 24 pages.

(Continued)

*Primary Examiner* — Jonathan L Sample

(74) *Attorney, Agent, or Firm* — Knobbe, Martens, Olson & Bear, LLP

(57)          ABSTRACT

Systems and methods are described for climbing of objects in an environment of a robot based on sensor data. A system can obtain sensor data of the environment. For example, the system can obtain sensor data from one or more sensors of robot. The system can identify the object based on the sensor data. Further, the system can determine that the object is climbable based on determining that the object corresponds to a particular training object. The system can determine that the object corresponds to the particular training object based on a particular characteristic of the object. The system can identify a climbing operation associated with the training object and instruct the robot to climb on the object based on the climbing operation.

24 Claims, 21 Drawing Sheets

(56) References Cited

U.S. PATENT DOCUMENTS

| | | | |
|---|---|---|---|
| 8,020,657 B2 | 9/2011 | Allard et al. | |
| 8,577,517 B2 | 11/2013 | Phillips et al. | |
| 8,781,629 B2 * | 7/2014 | Ota | B25J 9/1671 |
| | | | 700/258 |
| 8,873,831 B2 * | 10/2014 | Ahn | G05D 1/0272 |
| | | | 382/153 |
| 9,020,637 B2 | 4/2015 | Schnittman | |
| 9,037,396 B2 | 5/2015 | Pack et al. | |
| 9,250,078 B2 | 2/2016 | Kaiser et al. | |
| 9,308,648 B2 * | 4/2016 | Perkins | B25J 9/1674 |
| 9,329,598 B2 | 5/2016 | Pack et al. | |
| 9,360,300 B2 | 6/2016 | DiBernado et al. | |
| 9,387,588 B1 * | 7/2016 | Blankespoor | B25J 9/1692 |
| 9,519,289 B2 | 12/2016 | Munich et al. | |
| 9,561,592 B1 * | 2/2017 | da Silva | B62D 57/032 |
| 9,630,319 B2 | 4/2017 | Vicenti | |
| 9,744,670 B2 | 8/2017 | Romanov et al. | |
| 9,751,210 B2 | 9/2017 | Fong et al. | |
| 9,770,823 B2 | 9/2017 | Huang et al. | |
| 9,870,624 B1 | 1/2018 | Narang et al. | |
| 9,902,069 B2 | 2/2018 | Farlow et al. | |
| 9,908,240 B1 * | 3/2018 | da Silva | B25J 5/00 |
| 9,969,089 B2 | 5/2018 | Goel et al. | |
| RE47,108 E | 10/2018 | Jacobus et al. | |
| 10,096,129 B2 | 10/2018 | Narang et al. | |
| 10,353,399 B2 | 7/2019 | Ebrahimi Afrouzi | |
| 10,386,850 B2 | 8/2019 | Heinla et al. | |
| 10,391,630 B2 | 8/2019 | Fong et al. | |
| 10,611,023 B2 | 4/2020 | Fong et al. | |
| 10,890,921 B2 * | 1/2021 | Gillett | B25J 9/08 |
| 11,287,826 B2 * | 3/2022 | Whitman | G05D 1/0274 |
| 11,548,151 B2 * | 1/2023 | Whitman | G05D 1/0246 |
| 11,685,049 B2 * | 6/2023 | Klingensmith | B25J 11/00 |
| | | | 700/253 |
| 11,726,481 B2 * | 8/2023 | Perkins | B25J 9/1664 |
| | | | 701/27 |
| 12,059,814 B2 | 8/2024 | Bollini et al. | |
| 12,179,337 B2 * | 12/2024 | Gillett | B25J 9/162 |
| 12,263,597 B2 | 4/2025 | Klingensmith | |
| 2004/0138780 A1 * | 7/2004 | Lewis | B25J 19/021 |
| | | | 318/568.12 |
| 2005/0065650 A1 * | 3/2005 | Lewis | B25J 13/081 |
| | | | 700/245 |
| 2007/0013506 A1 * | 1/2007 | Takenaka | B25J 13/085 |
| | | | 340/500 |
| 2007/0227786 A1 * | 10/2007 | Hillis | B62D 57/04 |
| | | | 180/8.1 |
| 2007/0257910 A1 * | 11/2007 | Gutmann | G06V 20/10 |
| | | | 700/262 |
| 2010/0076599 A1 | 3/2010 | Jacobus et al. | |
| 2013/0138247 A1 | 5/2013 | Gutmann et al. | |
| 2016/0052574 A1 * | 2/2016 | Khripin | B25J 9/1694 |
| | | | 901/1 |
| 2016/0236349 A1 * | 8/2016 | Yamane | B25J 9/1664 |
| 2018/0231981 A1 | 8/2018 | Storfer et al. | |
| 2019/0110652 A1 | 4/2019 | Moroniti et al. | |
| 2020/0114515 A1 * | 4/2020 | Thackston | B25J 9/1664 |
| 2020/0324411 A1 * | 10/2020 | Li | B62D 57/032 |
| 2020/0324412 A1 * | 10/2020 | Whitman | B25J 9/1666 |
| 2020/0368616 A1 * | 11/2020 | Delamont | A63F 13/52 |
| 2020/0369333 A1 * | 11/2020 | Lavalley | B25J 11/0035 |
| 2021/0132625 A1 | 5/2021 | Gillett | |
| 2021/0283783 A1 * | 9/2021 | Gillett | G05D 1/0088 |
| 2021/0316448 A1 * | 10/2021 | Husain | G06V 10/776 |
| 2021/0365029 A1 | 11/2021 | Molina Cabrera et al. | |
| 2022/0026920 A1 | 1/2022 | Afrouzi et al. | |
| 2022/0187841 A1 | 6/2022 | Afrouzi et al. | |
| 2022/0241980 A1 * | 8/2022 | Bollini | B25J 9/1697 |
| 2023/0278214 A1 | 9/2023 | Klingensmith | |
| 2024/0189997 A1 * | 6/2024 | Lu | B25J 9/1664 |
| 2024/0351217 A1 | 10/2024 | Bollini et al. | |

FOREIGN PATENT DOCUMENTS

| | | |
|---|---|---|
| EP | 4284602 | 12/2023 |
| JP | 2001062766 | 3/2001 |
| JP | 2007196300 | 8/2007 |
| KR | 10-2023-0138487 | 10/2023 |
| WO | WO 2019/183727 A1 | 10/2019 |
| WO | WO 2021/216263 A1 | 10/2021 |
| WO | WO 2022/164793 | 8/2022 |

OTHER PUBLICATIONS

"Advanced Skills by Learning Locomotion and Local Navigation End-to-End," downloaded Mar. 13, 2024, https://sites.google.com/leggedrobotics.com/end-to-end-loco-navigation, 8 pages.

Martins, et al., "Extending Maps with Semantic and Contextual Object Information for Robot Navigation: a Learning-Based Framework Using Visual and Depth Cues" J. Intell. Robot Syst. 99, pp. 555-569, dated Feb. 29, 2020.

Rudin, et al., "Advanced Skills by Learning Locomotion and Local Navigation End-to-End," 2022 IEEE/RSJ International Conference on Intelligent Robots and Systems (IROS), Sep. 26, 2022, 7 pages, doi: 10.1109/IROS47612.2022.9981198.

Sidaoui, et al., "Human-in-the-loop Augmented Mapping," 2018 IEEE/RSJ International Conference on Intelligent Robots and Systems (IROS), pp. 3190-3195, dated Oct. 1, 2018.

Third Party Submission Document received in U.S. Appl. No. 17/648,869, 60 pages, dated Aug. 10, 2022.

International Search Report and Written Opinion for International Application No. PCT/US2022/013684, mailed May 6, 2022, 15 pages.

Winkler et al., "Path planning with force-based foothold adaptation and virtual model control for torque controlled quadruped robots," In 2014 IEEE Inter'l Conf Robotics Automation (ICRA) May 31, 2014 (pp. 6476-6482).

Winkler et al., "Path planning with force-based foothold adaptation and virtual model control for torque controlled quadruped robots," In 2014 IEEE Inter'l Conf Robotics Automation (ICRA) May 3, 20141 (pp. 6476-6482).

International Search Report and Written Opinion for Application No. PCT/US2021/025294 mailed Jun. 14, 2021 ; 12 pages.

* cited by examiner

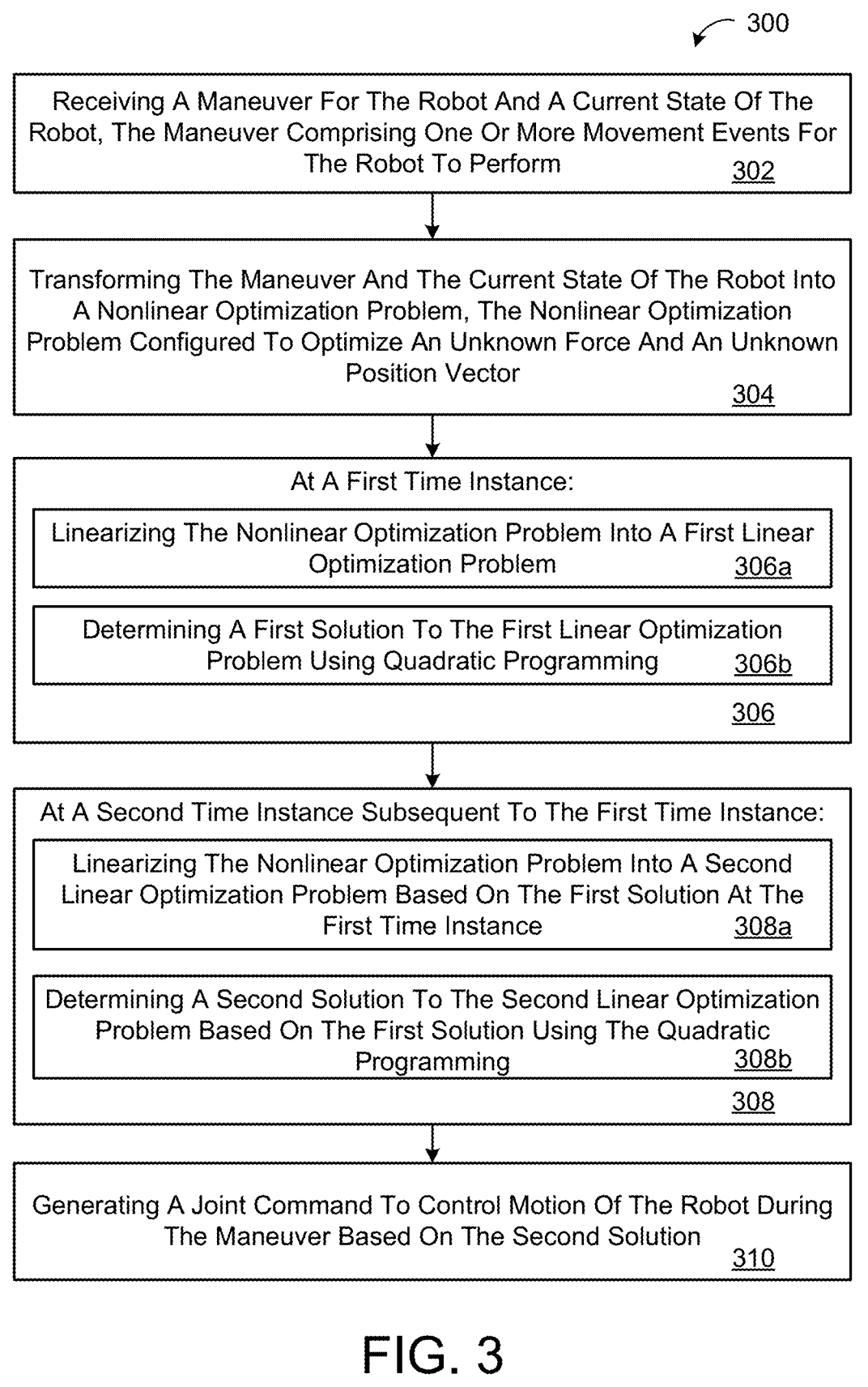

300

Receiving A Maneuver For The Robot And A Current State Of The Robot, The Maneuver Comprising One Or More Movement Events For The Robot To Perform     302

Transforming The Maneuver And The Current State Of The Robot Into A Nonlinear Optimization Problem, The Nonlinear Optimization Problem Configured To Optimize An Unknown Force And An Unknown Position Vector     304

At A First Time Instance:

Linearizing The Nonlinear Optimization Problem Into A First Linear Optimization Problem     306a Determining A First Solution To The First Linear Optimization Problem Using Quadratic Programming     306b

306

At A Second Time Instance Subsequent To The First Time Instance:

Linearizing The Nonlinear Optimization Problem Into A Second Linear Optimization Problem Based On The First Solution At The First Time Instance     308a Determining A Second Solution To The Second Linear Optimization Problem Based On The First Solution Using The Quadratic Programming     308b

308

Generating A Joint Command To Control Motion Of The Robot During The Maneuver Based On The Second Solution     310

FIG. 3

OBJECT CLIMBING BY LEGGED ROBOTS USING TRAINING OBJECTS

CROSS REFERENCE TO RELATED APPLICATIONS

This application claims priority under 35 U.S.C. § 119(e) to U.S. Provisional Application 63/387,208, filed on Dec. 13, 2022. The disclosure of this prior application is considered part of the disclosure of this application and is hereby incorporated by reference in its entirety.

TECHNICAL FIELD

This disclosure relates generally to robotics, and more specifically, to systems, methods, and apparatuses, including computer programs, for climbing objects.

BACKGROUND

Robotic devices can autonomously or semi-autonomously navigate environments to perform a variety of tasks or functions. The robotic devices can utilize sensor data to navigate the environments without contacting objects or becoming stuck or trapped. As robotic devices become more prevalent, there is a need to climb over objects associated with the environment.

SUMMARY

An aspect of the present disclosure provides a computer-implemented method including receiving, at data processing hardware of a robot, sensor data of an environment of the robot from one or more sensors of the robot. The method may include identifying, by the data processing hardware, an object in the environment based on the sensor data. Further, the method may include determining, by the data processing hardware, that a characteristic of the object corresponds to a characteristic of a training object of a plurality of training objects. Further, the method may include identifying, by the data processing hardware, a climbing operation from a plurality of climbing operations for the robot based on determining that the characteristic of the object corresponds to the characteristic of the training object. Each of the plurality of training objects may be associated with a respective climbing operation of the plurality of climbing operations. Further, the method may include instructing, by the data processing hardware, the robot to climb on the object based on the climbing operation.

In various embodiments, each of the plurality of climbing operations may be associated with a respective foot placement location for one or more feet of the robot.

In various embodiments, each of the plurality of climbing operations may be associated with a respective foot placement timing for one or more feet of the robot.

In various embodiments, each of the plurality of climbing operations may be associated with a respective force at one or more feet of the robot.

In various embodiments, each of the plurality of climbing operations may be associated with a respective pose for the robot.

In various embodiments, each of the plurality of climbing operations may be associated with a respective orientation for the robot.

In various embodiments, each of the plurality of climbing operations may be associated with a respective leg placement location for one or more legs of the robot.

In various embodiments, each of the plurality of climbing operations may be associated with a respective leg placement timing for one or more legs of the robot.

In various embodiments, each of the plurality of climbing operations may be associated with a placement location for a non-foot portion of one or more legs of the robot.

In various embodiments, each of the plurality of climbing operations may be associated with a placement timing for a non-foot portion of one or more legs of the robot.

In various embodiments, the method may further include determining the plurality of climbing operations.

In various embodiments, the method may further include determining the plurality of climbing operations using a controller.

In various embodiments, the method may further include instructing the robot to balance on two feet of the robot based on the climbing operation.

In various embodiments, the method may further include determining the plurality of climbing operations using a controller. The controller may be configured to determine a respective climbing operation of the plurality of climbing operations based on an input to the controller.

In various embodiments, the method may further include determining the plurality of climbing operations using a controller. The controller may be configured to determine a respective climbing operation of the plurality of climbing operations based on one or more of a joint position or a joint torque command.

In various embodiments, the method may further include determining the plurality of climbing operations using a controller. The controller may be configured to determine a respective climbing operation of the plurality of climbing operations based on an input to the controller. The input to the controller may include a respective foot placement location for one or more feet of the robot.

In various embodiments, the method may further include determining the plurality of climbing operations using a controller. The controller may be configured to determine a respective climbing operation of the plurality of climbing operations based on an input to the controller. The input to the controller may include a respective pose for the robot.

In various embodiments, the method may further include determining the plurality of climbing operations using a controller. The controller may be configured to determine a respective climbing operation of the plurality of climbing operations based on an input to the controller. The input to the controller may include a respective orientation for the robot.

In various embodiments, the method may further include determining the plurality of climbing operations using a controller. The controller may be configured to determine a respective climbing operation of the plurality of climbing operations based on an input to the controller. The input to the controller may include a respective leg placement location for one or more legs of the robot.

In various embodiments, the method may further include determining the plurality of climbing operations using a controller. The controller may be configured to determine a respective climbing operation of the plurality of climbing operations based on an input to the controller. The input to the controller may include the characteristic of the object.

In various embodiments, the method may further include determining the plurality of climbing operations using a controller. The controller may be configured to determine a respective climbing operation of the plurality of climbing operations based on an input to the controller. The input to the controller may include a height of the object.

In various embodiments, the method may further include determining the plurality of climbing operations using a controller. The controller may be configured to determine a respective climbing operation of the plurality of climbing operations based on an input to the controller. The input to the controller may include a state of the robot.

In various embodiments, the method may further include receiving second sensor data of the environment from the one or more sensors of the robot. The method may further include identifying a second object in the environment based on the second sensor data. Further, the method may include determining that a characteristic of the second object corresponds to a characteristic of a second training object of the plurality of training objects. The characteristic of the second object and the characteristic of the object may be different characteristics. Further, the method may include identifying a second climbing operation from the plurality of climbing operations for the robot based on determining that the characteristic of the second object corresponds to the characteristic of the second training object. The second climbing operation and the climbing operation may be different climbing operations Further, the method may include instructing the robot to climb on the second object based on the second climbing operation.

In various embodiments, the method may further include receiving second sensor data of the environment from the one or more sensors of the robot. Further, the method may include identifying a second object in the environment based on the second sensor data. Further, the method may include determining that a characteristic of the second object does not correspond to a characteristic of a training object of the plurality of training objects.

In various embodiments, the method may further include receiving second sensor data of the environment from the one or more sensors of the robot. The method may further include identifying a second object in the environment based on the second sensor data. The method may further include determining that a characteristic of the second object does not correspond to a characteristic of a training object of the plurality of training objects. The method may further include determining that the robot cannot climb on the second object based on determining that the characteristic of the second object does not correspond to a characteristic of a training object of the plurality of training objects.

In various embodiments, the method may further include receiving second sensor data of the environment from the one or more sensors of the robot. The method may further include identifying a second object in the environment based on the second sensor data. The method may further include determining that a characteristic of the second object does not correspond to a characteristic of a training object of the plurality of training objects. The method may further include determining that the robot cannot climb on the second object based on determining that the characteristic of the second object does not correspond to a characteristic of a training object of the plurality of training objects. The method may further include instructing display of a user interface on a user computing device. The user interface may include information indicating that the robot cannot climb on the second object.

In various embodiments, the method may further include receiving second sensor data of the environment from the one or more sensors of the robot. The method may further include identifying a second object in the environment based on the second sensor data. The method may further include determining that a characteristic of the second object does not correspond to a characteristic of a training object of the plurality of training objects. The method may further include determining that the robot cannot climb on the second object based on determining that the characteristic of the second object does not correspond to a characteristic of a training object of the plurality of training objects. The method may further include instructing display of a user interface on a user computing device. The user interface may include information indicating that the robot cannot climb on the second object and may reflect a virtual representation of one or more of the robot or the second object.

In various embodiments, the method may further include accessing a set of policies. Each policy of the set of policies may link a particular climbing operation of the plurality of climbing operations to a particular training object of the plurality of training objects. Identifying the climbing operation for the robot may be based on the set of policies.

In various embodiments, the characteristic of the object may include a height of the object.

In various embodiments, the characteristic of the object may include a height of the object is between 30 centimeters and 100 centimeters.

In various embodiments, the characteristic of the object may include information indicating that the object comprises a vehicle.

In various embodiments, a first training object of the plurality of training objects may be associated with a first characteristic and a second training object of the plurality of training objects may be associated with a second characteristic.

In various embodiments, the plurality of training objects may be associated with a plurality of characteristics.

In various embodiments, one or more training objects of the plurality of training objects may be associated with noise.

In various embodiments, the computing system may determine that one or more of the robot or the sensor data is associated with noise. The computing system may adjust the characteristic of the training object based on the noise to generate a noisy training object and may add the noisy training object to the plurality of training objects.

In various embodiments, the computing system may determine that one or more of the robot or the sensor data is associated with noise. The computing system may generate the climbing operation based on the noise.

In various embodiments, the method may further include adding noise to one or more training objects to generate one or more noisy training objects. The method may further include adding the one or more noisy training objects to the plurality of training objects.

In various embodiments, the plurality of training objects may be associated with a plurality of characteristics. The plurality of characteristics may include a plurality of heights.

In various embodiments, the plurality of training objects may include one or more of a vehicle, a trailer, a box, a platform, a rock wall, or a stage.

In various embodiments, the robot may include four legs.

In various embodiments, the robot may include four legs. Instructing the robot to climb on the object may include instructing the robot to place at least two of the four legs on the object.

In various embodiments, the robot may include two front legs and two rear legs. Instructing the robot to climb on the object may include instructing the robot to place the two front legs on the object.

In various embodiments, the robot may include two front legs and two rear legs. Each of the two front legs may have a rear shank portion. Instructing the robot to climb on the object may include instructing the robot to place a rear shank portion of a first front leg of the two front legs and a rear shank portion of a second front leg of the two front legs on the object.

In various embodiments, the robot may include four legs. Instructing the robot to climb on the object may include instructing the robot to place at least two of the four legs on the object. The method may further include shifting a weight distribution of the robot.

In various embodiments, the robot may include two front legs and two rear legs. Instructing the robot to climb on the object may include instructing the robot to shift a position of the two rear legs relative to the object. The method may further include instructing the robot to place the two front legs on the object. The method may further include shifting a weight distribution of the robot.

In various embodiments, the robot may include two front legs and two rear legs. Instructing the robot to climb on the object may include instructing the robot to shift a position of the two rear legs relative to the object. The method may further include instructing the robot to provide a downward force via one or more of the two rear legs or the two front legs. The method may further include instructing the robot to place the two front legs on the object. The method may further include shifting a weight distribution of the robot.

In various embodiments, the robot may include two front legs and two rear legs. Instructing the robot to climb on the object may include instructing the robot to flex the two rear legs. The method may further include instructing the robot to extend the two rear legs. The method may further include instructing the robot to flex the two front legs and place the two front legs on the object. The method may further include instructing the robot to extend the two front legs.

In various embodiments, the robot may include two front legs and two rear legs. Instructing the robot to climb on the object may include instructing the robot to flex the two rear legs. The method may further include instructing the robot to extend the two rear legs. The method may further include instructing the robot to flex the two front legs and place the two front legs on the object. The method may further include instructing the robot to extend the two front legs. The method may further include instructing the robot to flex the two rear legs and place the two rear legs on the object.

In various embodiments, instructing the robot to climb on the object based on the climbing operation may include instructing the robot, using a first controller of the robot, to climb on the object. The robot may be configured to utilize a second controller of the robot for stair navigation.

In various embodiments, determining that the characteristic of the object corresponds to the characteristic of the training object may be further based on comparing the characteristic of the object to a respective characteristic of one or more training objects of the plurality of training objects.

In various embodiments, determining that the characteristic of the object corresponds to the characteristic of the training object may include determining that the characteristic of the object matches the characteristic of the training object.

In various embodiments, determining that the characteristic of the object corresponds to the characteristic of the training object may include determining that the characteristic of the object is within a particular degree of similarity of the characteristic of the training object.

In various embodiments, identifying the climbing operation may include accessing a machine learning model. The machine learning model may be trained to output a particular climbing operation based on an input of a particular training object.

In various embodiments, identifying the climbing operation may include accessing a machine learning model. The machine learning model may be trained to output a particular climbing operation based on an input of a particular training object. The machine learning model may be trained using the plurality of training objects.

In various embodiments, identifying the climbing operation may include accessing a machine learning model. The machine learning model may be trained to output a particular climbing operation based on an input of a particular training object. The machine learning model may be trained utilizing the plurality of training objects. The method may further include identifying an updated plurality of training objects. Further, the method may include retraining the machine learning model utilizing the updated plurality of training objects.

In various embodiments, identifying the climbing operation may include accessing a machine learning model. The machine learning model may be trained to output a particular climbing operation based on an input of a particular training object. The machine learning model may be trained utilizing the plurality of training objects. The method may include identifying a second object. Further, the method may include determining the plurality of training objects does not include a particular training object corresponding to the second object. Further, the method may include retraining the machine learning model utilizing the second object based on determining the plurality of training objects does not include a particular training object corresponding to the second object.

In various embodiments, the sensor data may be captured based on movement of the robot along a route through the environment.

In various embodiments, the sensor data may include point cloud data.

In various embodiments, the sensor data may include height data.

In various embodiments, the one or more sensors may include a stereo camera, a scanning light-detection and ranging sensor, or a scanning laser-detection and ranging sensor.

In various embodiments, the method may further include instructing display of a user interface on a user computing device. The user interface may reflect a virtual representation of the object.

In various embodiments, the method may further include instructing display of a user interface on a user computing device. The user interface may reflect a virtual representation of the object. The method may further include obtaining one or more instructions to climb the object based on the user interface.

In various embodiments, the method may further include instructing display of a user interface on a user computing device. The user interface may reflect a virtual representation of the object. The method may further include obtaining one or more instructions to climb the object based on the user interface. Instructing the robot to climb on the object may further be based on the one or more instructions.

According to various embodiments of the present disclosure, a computer-implemented method can include receiving, at data processing hardware, sensor data from at least one sensor of a robot. The sensor data may correspond to an environment with an obstacle of the robot. The method may further include determining, by the data processing hardware, that the obstacle corresponds to a scalable obstacle of a plurality of scalable obstacles for the robot. The plurality of scalable obstacles may be associated with a plurality of heights. The method may further include instructing, by the data processing hardware, the robot to scale the obstacle based on determining that the obstacle corresponds to the scalable obstacle.

According to various embodiments of the present disclosure, a computer-implemented method can include receiving, at data processing hardware of a robot, sensor data from at least one sensor of the robot. The method may further include identifying, by the data processing hardware, an object based on the sensor data. The method may further include selecting, by the data processing hardware, from a plurality of operations, an operation to interact with the object. The plurality of operations may be associated with a plurality of objects having different heights. The method may further include instructing movement, by the data processing hardware, of a distal end of a leg of a robot to interact with the object according to the operation.

According to various embodiments of the present disclosure, a robot can include at least one sensor, at least two legs, data processing hardware in communication with the at least one sensor, and memory in communication with the data processing hardware, the memory storing instructions that when executed on the data processing hardware can cause the data processing hardware to obtain sensor data captured from an environment by the at least one sensor. Execution of the instructions may further cause the data processing hardware to identify an object in the environment based on the sensor data. Execution of the instructions may further cause the data processing hardware to determine that the object corresponds to a training object of a plurality of training objects based on a characteristic of the object. Execution of the instructions may further cause the data processing hardware to identify an operation from a plurality of operations based on determining that the object corresponds to the training object. Each of the plurality of training objects may be associated with a respective operation of the plurality of operations. Execution of the instructions may further cause the data processing hardware to instruct traversal of the object using the at least two legs based on the operation.

The details of the one or more implementations of the disclosure are set forth in the accompanying drawings and the description below. Other aspects, features, and advantages will be apparent from the description and drawings, and from the claims.

DESCRIPTION OF DRAWINGS

FIG. 3 is a flowchart of an example arrangement of operations for a robot to perform a maneuver using a maneuver controller.

Like reference symbols in the various drawings indicate like elements.

DETAILED DESCRIPTION

Figure 1A:
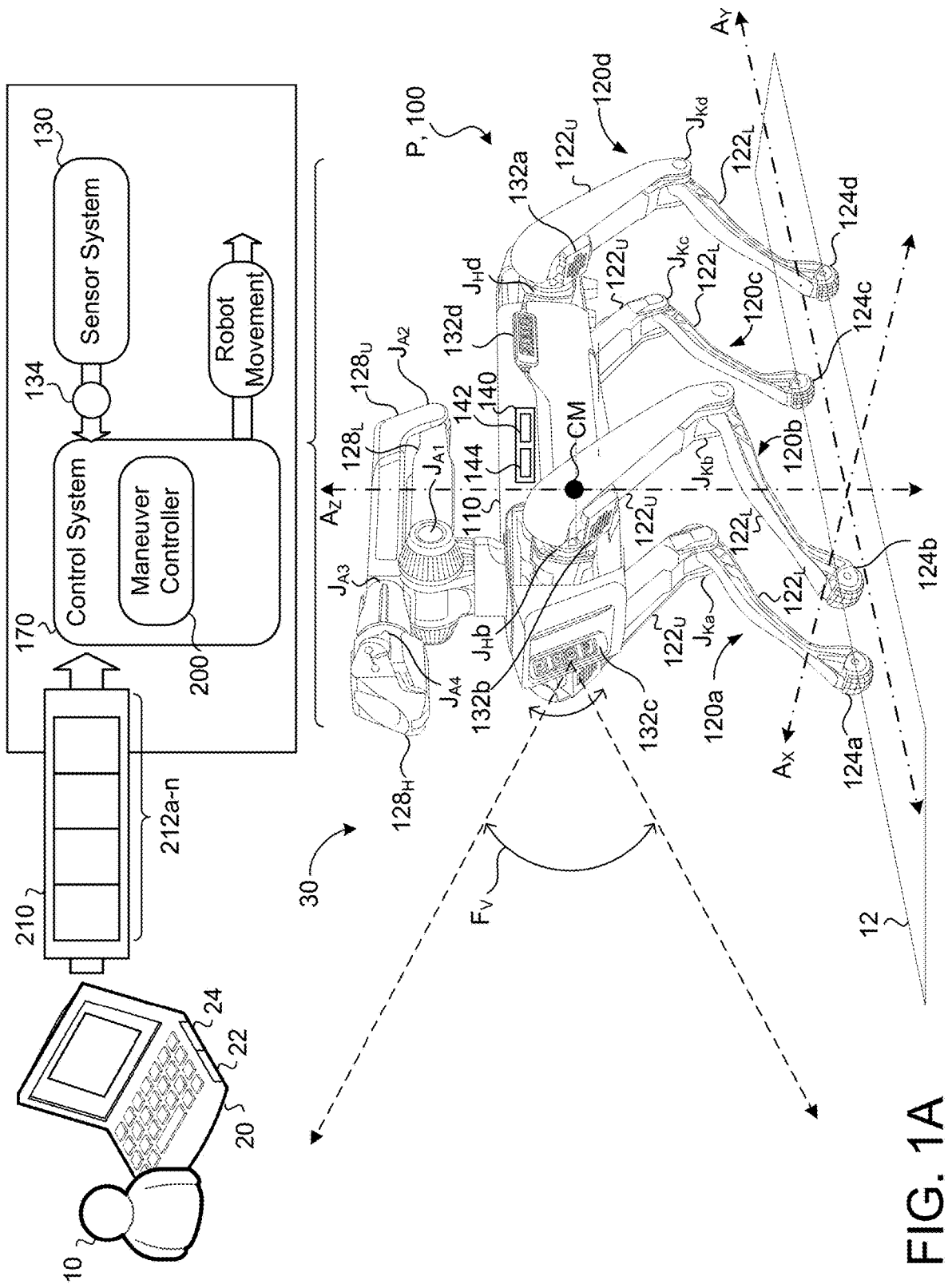
FIG. 1A is a perspective view of an example robot in a robotic environment.

Generally described, autonomous and semi-autonomous robots can utilize mapping, localization, and navigation systems to map an environment utilizing sensor data obtained by the robots. Further, the robots can utilize the systems to perform navigation and/or localization in the environment.

The present disclosure relates to the use of sensor data obtained by the robot to identify an operation (e.g., a climbing operation) for the robot to climb an object in the environment. A system can identify the operation from a plurality of operations that are each mapped to a particular object such that the operation is customized (e.g., specific to) the particular object in the environment.

The system can identify sensor data (e.g., point cloud data, etc.) associated with the environment (e.g., sensor data associated with traversal of the environment by a robot). For example, the system can communicate with a sensor of a robot and obtain sensor data associated with an environment of the robot as the robot traverses the environment.

The sensor data may identify features of the environment (e.g., objects). For example, the features may include one or more walls, stairs, humans, robots, vehicles, toys, pallets, rocks, or other objects that may affect the movement of the robot as the robot traverses the site. In some cases, the objects in the environment may include obstacles and/or structures. The features may include static obstacles (e.g., obstacles that are not capable of self-movement) and/or dynamic obstacles (e.g., obstacles that are capable of self-movement). Further, the obstacles may include obstacles that are integrated into the environment (e.g., the walls, stairs, the ceiling, etc.) and obstacles that are not integrated into the environment (e.g., a ball on the floor or on a stair).

The sensor data may identify the features of the environment based on a particular protocol. In some cases, the sensor data may indicate the presence of a feature based on the absence of sensor data and/or a grouping of sensor data. For example, a grouping of sensor data in a particular shape or configuration may indicate the presence of a particular object (e.g., a box, a platform, etc.).

Based on the sensor data, the system may identify an object in the environment. For example, the system may identify the presence of a box in the environment based on the sensor data.

In traditional systems, while systems may identify objects using sensor data, the systems may be unable to dynamically identify how to climb over the objects. In some cases, the systems may be provided with a particular mode for climbing over a particular object (e.g., objects below a particular height). For example, the systems may be provided with a stair mode such that when the robot enters the stair mode, a navigational behavior of the robot changes (e.g., a gait, a cadence). A user may identify a particular object and cause the robot to enter the particular mode. However, the navigational behavior of the robot in the particular mode may not be suitable for particular objects. For example, the navigational behavior of the robot in the particular mode may only be suitable for objects at a particular height or within a particular range of heights (e.g., stairs). The navigational behavior of the robot in the particular mode may cause the robot to contact the object, trip, fall, etc. when used for objects that are outside of the particular range of heights or not at the particular height.

In some cases, a robot may attempt to climb over an object while maintaining the navigational behavior of the robot (e.g., the navigational behavior of the robot while traversing a particular environment). For example, the robot may attempt to climb over multiple objects with different characteristics while utilizing the same navigational behavior. However, such an attempt may cause the robot to contact one or more of the objects, trip, fall, or otherwise be unsuccessful in climbing over one or more of the objects. Therefore, the robot may be unable to climb over objects that are not scalable using the navigational behavior of the robot.

As the object may impede or block access to a particular section of the environment, it may be important for the robot to be able to climb over the object. For example, the robot may be assigned a task to perform at a location that is impeded or blocked by the object. In some cases, the object may prevent the robot from performing particular types of tasks (e.g., room mapping, leak monitoring, temperature monitoring, etc.).

In some cases, a system may use sensors that are located in a location externally and separately from the robot. For example, the sensors may be located at various locations around the environment separate from the robot. The use of such sensors may be inefficient, cost prohibitive, etc. as such sensors may require the sensors to be separately set up and configured within the environment prior to traversal of the environment by the robot.

Therefore, such traditional systems may cause issues and/or inefficiencies (e.g., inefficiencies in performing commands) as the robot may be unable to climb particular objects. Further, such an inability may cause a loss of confidence in the performance of the robot.

In some cases, a user may attempt to manually identify an operation for the robot. However, such a process may be inefficient and error prone as the robot may be associated with a large number of potential operations (e.g., based on variations in foot placement, leg placement, etc.). Further, implementing such a trial-and-error process may be time intensive and may cause damage to the robot as such a process may cause the robot to fall, trip, contact the object, etc. for all or a portion of the operations that are unsuccessful.

The methods and apparatus described herein enable a system to navigate the environment. The system can identify one or more operations for the robot to perform to navigate (e.g., climb, climb over, climb on, scale, etc.) the object. The system can identify the one or more operations based on the particular object identified in the environment. For example, the system can identify different operations for different objects (e.g., based on one or more characteristics of the objects).

The system can instruct the robot to perform one or more operations for the robot to climb the object based on a particular operation that is associated with the object. The system can automatically identify the operation based on obtained sensor data and instruct the robot to climb the object.

The system can implement a maneuver controller that is capable of building movements for the robot. The maneuver controller may provide a flexible framework for generating dynamic robot behavior. Further, the maneuver controller may be a rapid prototyping pipeline to generate new robot behaviors (e.g., movement routines or movement patterns).

As components (e.g., mobile robots) proliferate, the demand for components with increased capabilities has increased. Specifically, the demand for a robot that can climb objects with different characteristics has increased. For example, a user may attempt to direct a robot to maneuver to a particular location of a site that is impeded by a particular object. The present disclosure provides systems and methods that enable an increase in the navigability and an increase in the efficiency and performance of the robot.

Further, the present disclosure provides systems and methods that enable a reduction in the time and user interactions, relative to traditional embodiments, to climb objects within the environment without significantly affecting the power consumption or speed of the robot. These advantages are provided by the embodiments discussed herein, and specifically by implementation of a process that includes the identification of a operation for the robot based on obtained sensor data and the instruction of the implementation of the operation.

As described herein, the process of identifying a operation for the robot based on obtained sensor data and instructing the implementation of the operation may include training the robot to associate one or more operations with one or more training objects. A system (implemented by the robot or by a separate system) may obtain data identifying one or more training objects that are associated with different characteristics (e.g., a height and/or height range of the training object, a width and/or width range of the training object, a depth and/or depth range of the training object, a classification of the training object, etc.). The system may include a simulation component to simulate a simulated robot climbing the one or more training objects using a plurality of operations. Based on the simulation, the system can identify a particular operation for the training object (e.g., a climbing operation that results in successfully climbing the training object by the simulated robot).

To identify the operation, the system can obtain sensor data associated with an environment of the robot. For example, the system may obtain sensor data from one or more sensors of the robot (e.g., based on traversal of the site by the robot). The system can further identify robot parameters associated with the robot and identify a state of the robot.

The system may identify an object in the environment based on the sensor data. For example, the sensor data may include point cloud data and the system may identify the presence of a particular object based on the point cloud data (e.g., a particular grouping of point cloud data). Further, the system can identify a characteristic of the object (e.g., a height).

The system can identify a training object associated with the object. Further, the system can compare a characteristic of the object with one or more characteristics of one or more training objects utilized by the simulation component to identify the training object associated with the object. Based on the comparison, the system can identify a training object with a characteristic that matches or is within a particular range of the characteristic of the object. For example, the system can identify a training object with a height that matches or is within a particular range (e.g., 3 inches) of the height of the object.

The system can identify an operation linked to the training object. Based on identification of the training object, the system can access association data (e.g., generated by a simulation component) that links one or more training objects, one or more robot parameter(s), and an operation. For example, the system can identify an operation, using the association data, that is linked by the simulation component to the training object having the characteristic(s) and a robot associated with the robot parameter(s). The simulation component may generate the association data based on determining that the operation results in successfully climbing the training object by the simulated robot.

Based on identification of the operation, the system can instruct the robot to climb the object. For example, the system can instruct the robot to perform the operation to climb the object.

Referring to FIG. 1A, the robot 100 includes a body 110 with locomotion based structures such as legs 120a-d coupled to the body 110 that enable the robot 100 to move about the environment 30. In some examples, each leg of the legs 120a-d is an articulable structure such that one or more joints J permit members of the leg to move. For instance, each leg includes a hip joint $J_H$ coupling an upper member $122_U$ of the leg to the body 110 and a knee joint $J_K$ coupling the upper member $122_U$ of the leg to a lower member $122_L$ of the leg. Although FIG. 1A depicts a quadruped robot with four legs 120a-d, the robot 100 may include any number of legs or locomotive based structures (e.g., a biped or humanoid robot with two legs) that provide a means to traverse the terrain within the environment 30.

The legs 120a-d include a front right leg 120a and a front left leg 120b that are located and oriented in the front of the robot 100 relative to a direction of traversal of the environment by the robot. Further, the legs 120a-d include a rear right leg 120c and a rear left leg 120d that are located and oriented in the rear of the robot 100 relative to a direction of traversal of the environment by the robot. Further, the front right leg 120a and the front left leg 120b are located and oriented in the front of the robot 100 and the rear right leg 120c and the rear left leg 120d are located and oriented in the rear of the robot 100 such that the legs 120a-d flex towards the front of the robot 100 and extend towards the rear of the robot 100.

In order to traverse the terrain, each leg of the legs 120a-d has a distal end that contacts a surface of the terrain (e.g., a traction surface). For example, the front right leg 120a has a distal end 124a, the front left leg 120b has a distal end 124b, the rear right leg 120c has a distal end 124c, and the rear left leg 120d has a distal end 124d. The distal end of the leg may be the end of the leg used by the robot 100 to pivot, plant, or provide traction during movement of the robot 100. For example, the distal end of a leg corresponds to a foot of the robot 100. In some examples, though not shown, the distal end of the leg includes an ankle joint $J_A$ such that the distal end is articulable with respect to the lower member $122_L$ of the leg.

In the example of FIG. 1A, the robot 100 includes a robotic manipulator (e.g., arm 126). The arm 126 may move about multiple degrees of freedom in order to engage elements of the environment 30 (e.g., objects within the environment 30). In some examples, the arm 126 includes one or more members where the members are coupled by joints J such that the arm 126 may pivot or rotate about the joint(s) J. For instance, with more than one member, the arm 126 may extend or to retract. To illustrate an example, FIG. 1A depicts the arm 126 with three members corresponding to a lower member 128L, an upper member $128_U$, and a hand member $128_H$. The lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, the hand member $128_H$ includes additional members to enable different types of grasping. These additional members may range from a simple two member claw-like hand member $128_H$ to a more complicated hand member $128_H$ that simulates the digits of a human hand. In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 may have a vertical gravitational axis (e.g., shown as a Z-direction axis $A_Z$) along a direction of gravity, and a center of mass CM, which may be a position that corresponds to an average position of all parts of the robot 100 where the parts are weighted according to their masses (e.g., a point where the weighted relative position of the distributed mass of the robot 100 sums to zero). The robot 100 further may have a pose P based on the CM relative to the vertical gravitational axis $A_Z$ (e.g., the fixed reference frame with respect to gravity) to define a particular attitude or stance assumed by the robot 100. The attitude of the robot 100 can be defined by an orientation or an angular position of the robot 100 in space. Movement by all or a portion of the legs 120a-d relative to the body 110 may alter the pose P of the robot 100 (e.g., the combination of the position of the CM of the robot and the attitude or orientation of the robot 100). A height may be a distance along the z-direction. The sagittal plane of the robot 100 may correspond to the Y-Z plane extending in directions of a y-direction axis $A_Y$ and the z-direction axis $A_Z$. The sagittal plane may bisect the robot 100 into a left and a right side. Perpendicular to the sagittal plane, a ground plane (also referred to as a transverse plane) may span the X-Y plane by extending in directions of the x-direction axis $A_X$ and the y-direction axis $A_Y$. The ground plane may refer to a ground surface 12 where a distal end of the leg of the robot 100 may generate traction to help the robot 100 move about the environment 30. Another anatomical plane of the robot 100 may be the frontal plane that extends across the body 110 of the robot 100 (e.g., from a left side of the robot 100 with a front left leg 120*b* to a right side of the robot 100 with a front right leg 120*a*). The frontal plane may span the X-Z plane by extending in directions of the x-direction axis $A_X$ and the z-direction axis $A_z$.

When a legged-robot moves about the environment 30, all or a portion of the legs 120*a-d* of the robot 100 may either be in contact with the ground surface 12 or not in contact with the ground surface 12. When a leg of the robot 100 is in contact with the ground surface 12, the leg may be referred to as a stance leg. When a leg is not in contact with the ground surface 12, the leg may be referred to as a swing leg. A leg may transition from a stance leg to a swing leg when the leg lifts-off (LO) from the ground surface 12. Accordingly, a swing leg may also transition to a stance leg when the swing leg touches down (TD) against the ground surface 12 after not being in contact with the ground surface 12. A leg of the robot 100 may function as a swing leg and another leg of the robot 100 may function as a stance leg (e.g., to maintain balance for the robot 100).

In order to maneuver about the environment 30, the robot 100 includes a sensor system 130 with one or more sensor arrays 132*a-n* (e.g., shown as a first sensor array 132*a*, a second sensor array 132*b*, a third sensor array 132*c*, and a fourth sensor array 132*d*). All or a portion of the sensor arrays 132*a-n* may include one or more sensors. The one or more sensors may include sensors having different sensor types. The one or more sensors may include vision/image sensors (e.g., three-dimensional volumetric image sensors), inertial sensors (e.g., an inertial measurement unit (IMU)), force sensors, and/or kinematic sensors. Some examples of the one or more sensors include a camera such as a stereo camera, a scanning light-detection and ranging (LIDAR) sensor, or a scanning laser-detection and ranging (LADAR) sensor. In some examples, all or a portion of the one or more sensors have a corresponding field(s) of view $F_v$ defining a sensing range or region corresponding to the one or more sensors. For instance, FIG. 1A depicts a field of a view $F_V$ for the robot 100. All or a portion of the one or more sensors may be pivotable and/or rotatable such that the one or more sensors may, for example, change the field of view $F_V$ about one or more axis (e.g., an x-axis, a y-axis, or a z-axis in relation to a ground plane).

When surveying a field of view $F_V$ with a sensor of the one or more sensor arrays 132*a-n*, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) of the one or more sensor arrays 132*a-n* that are coupled to a joint J. In some examples, the sensor(s) may be coupled to a motor M that operates a joint J of the robot 100 (e.g., sensor arrays 132*a-b*). The sensor(s) may generate joint dynamics in the form of joint-based sensor data 134. Joint dynamics collected as joint-based sensor data 134 may include joint angles (e.g., an upper member 122$_U$ relative to a lower member 122$_L$), joint speed (e.g., joint angular velocity or joint angular acceleration), and/or forces experienced at a joint J (also referred to as joint forces). Joint-based sensor data 134 generated by one or more sensors may be raw sensor data, data that is further processed to form different types of joint dynamics 134$_{JD}$, or some combination of both. For example, a sensor can measure joint position (or a position of member(s) 122 coupled at a joint J) and systems of the robot 100 can perform further processing to derive velocity and/or acceleration from the positional data. In another example, a sensor may measure velocity and/or acceleration (e.g., directly).

As the sensor system 130 gathers sensor data 134, a computing system 140 may store, process, and/or communicate the sensor data 134 to various systems of the robot 100 (e.g., the control system 170 and/or the maneuver system 200). In order to perform computing tasks related to the sensor data 134, the computing system 140 of the robot 100 includes data processing hardware 142 and memory hardware 144. The data processing hardware 142 may execute instructions stored in the memory hardware 144 to perform computing tasks related to activities (e.g., movement and/or movement based activities) for the robot 100. The computing system 140 may include one or more locations of data processing hardware 142 and/or memory hardware 144.

In some examples, the computing system 140 is a local system located on the robot 100. When located on the robot 100, the computing system 140 may be centralized in a single location/area on the robot 100 (e.g., centralized in the body 110 of the robot 100), decentralized (e.g., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg) while a centralized computing system 140 may allow for a central processing hub that communicates to systems located at various positions on the robot 100 (e.g., communicate to the motor that moves the joint of the leg).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Sensor data 134 or other processed data (e.g., data processing locally by the computing system 140) may be stored in the remote system 160 and may be accessible to the computing system 140. In some cases, the computing system 140 may utilize the remote resources 162, 164 as extensions of the computing resources 142, 144 such that resources of the computing system 140 may reside on resources of the remote system 160.

Figure 1B:
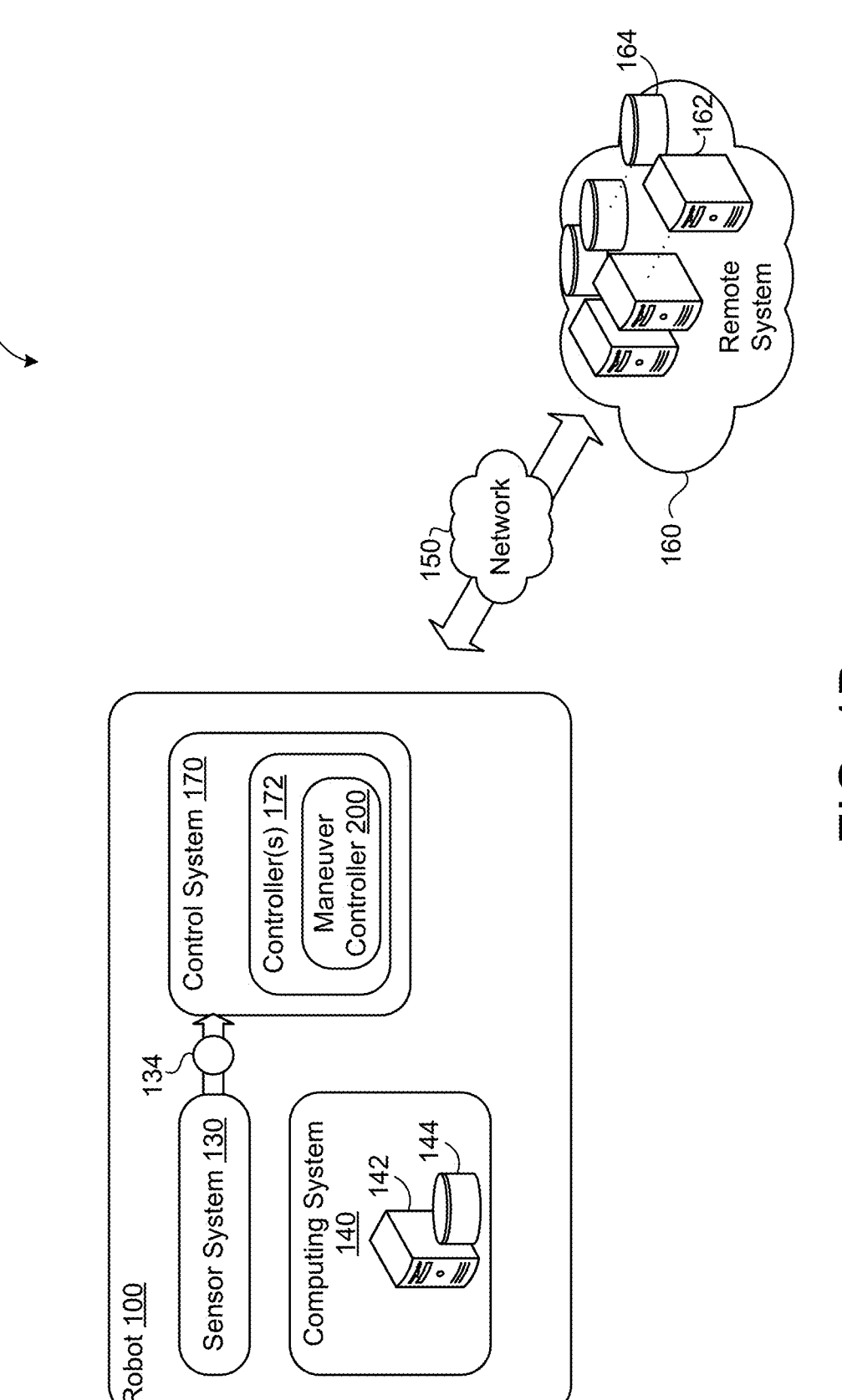
FIG. 1B is a schematic view of an example system of the robot of FIG. 1A.

In some implementations, as shown in FIGS. 1A and 1B, the robot 100 includes a control system 170. The control system 170 may communicate with systems of the robot 100 such as the at least one sensor system 130. The control system 170 may perform operations and other functions using hardware 140. The control system 170 includes at least one controller 172. The at least one controller 172 can control the robot 100. For example, the controller 172 controls movement of the robot 100 to traverse about the environment 30 based on input or feedback from the systems of the robot 100 (e.g., the sensor system 130 and/or the control system 170). In some implementations, the controller 172 controls movement between poses and/or behaviors of the robot 100.

In some examples, a controller 172 controls the robot 100 by controlling movement about one or more joints J of the robot 100. In some configurations, a controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J) or control multiple joints J of the robot 100. When controlling multiple joints J, the controller 172 may apply the same or different torques to each joint J controlled by the controller 172. By controlling multiple joints J, a controller 172 may coordinate movement for a larger structure of the robot 100 (e.g., the body 110, one or more legs of the robot 100, the arm 126). For all or a portion of the maneuvers 210, a controller 172 may control movement of multiple parts of the robot 100 such as, for example, the front right leg 120a and the front left leg 120b, four legs 120a-d, or the front right leg 120a and the front left leg 120b combined with the arm 126.

In some implementations, the one or more controllers 172 of the control system 170 include a maneuver controller 200. The maneuver controller 200 may function like other controllers 172 of the control system 170, but may be additionally capable of providing control for inputs referred to as maneuvers 210. The maneuver controller 200 may be a controller 172 capable of dynamically planning a maneuver 210. A maneuver 210 may be a control specification that defines (e.g., sparsely defines) one or more movement events. In some examples, the maneuver 210 is user-facing such that a user 10 writes the control specification defining the maneuver 210 (e.g., with some basic coding). Although the control specification may include some degree of coding, the maneuver 210 may have a minimal specification. By having a minimal specification, the user 10 may be able to quickly and/or to efficiently generate new behaviors for the robot 100 and/or modify old behaviors. As part of the specification, the user 10 describes the behavior that the user 10 wants the robot 100 to perform based on one or more movement events 212a-n. For example, with a legged robot 100, often maneuvers 210 predominantly affect leg motion. The one or more movement events 212a-n for a legged robot 100 may include touchdown of a foot of a leg and/or liftoff of a foot of a leg. In some examples, the one or more movement events 212a-n may describe chronologically what the user 10 wants the robot 100 to do in the behavior. Further, the one or more movement events 212a-n may include a movement (or lack thereof) and time duration for the movement. The one or more movement events 212a-n may include movement pauses where the robot 100 is not performing any movement. For example, if the user 10 wants the robot 100 to perform a handstand as the maneuver 210, the movement events of the handstand maneuver 210 may describe touchdown for the front right leg 120a and the front left leg 120b followed by liftoff for the rear right leg 120c and the rear left leg 120d of the robot 100 and ending with a pause/wait period of some specified duration (e.g., to hold the handstand position). The maneuver controller 200 may interpret the maneuver 210. For example, the maneuver controller 200 may analyze the maneuver 210 chronologically from a beginning of the maneuver 210 to the end of the maneuver 210 such that the maneuver 210 may not dynamically change during execution.

In some implementations, the maneuver 210 is stateless. For example, the maneuver 210 may be based on what a user 10 wants the robot 100 to do for a behavior and not what the robot 100 is currently doing. This stateless approach may also simplify maneuver generation by the user 10 because the user 10 may not determine potentially more complicated current dynamics of the robot 100 and/or dynamics of the environment 30 about the robot 100.

In some examples, the maneuver controller 200 receives more than one maneuvers 210. For instance, the user 10 generates more than one maneuver 210 and requests that the robot 100 perform two or more maneuvers 210 at the same time. In some implementations, the robot 100 communicates with an interface that includes preprogrammed or a hard-coded list of maneuvers 210 that the user 10 may select the robot 100 to perform. Although the interface may include a finite number of maneuvers 210, the interface may allow the user 10 to combine maneuvers 210 in various ways for greater customization. This type of controlled customization may be preferable for users 10 with little or no coding capabilities or when a robot owner wants to control the types of maneuvers 210 that the robot 100 receives.

Some maneuvers 210 may passively control portions of the robot 100 (e.g., joints J of the robot 100) while other maneuvers 210 actively control portions of the robot 100 (e.g., joints J of the robot 100). State differently, a passive maneuver 210 refers to a behavior that modifies a primary behavior. With respect to joint control, two maneuvers 210 may impact similar joints J. For example, practically speaking, movement of the body 110 occurs by making a change to at least one joint J of at least one leg of the robot 100. Yet, when the joints J of the leg are already allocated to a maneuver 210 (e.g., for footstep maneuvers 210 or leg maneuvers), a movement of the body 110 may cause joint control interference. Further, a body maneuver 210 may be a secondary consideration that may impact joint control when it would not interfere with, for example, a leg maneuver 210. In some examples, to prevent issues caused by joint interference, certain maneuvers 210 are designated during creation as passive maneuvers 210 or primary maneuvers 210. In some implementations, the maneuver controller 200 determines whether a maneuver 210 is a passive maneuver 210 and suggests a behavior modification to a primary behavior or a maneuver 210 associated with a primary behavior when the maneuver 210 is a passive maneuver 210. A maneuver 210 that may modify a behavior may be referred to as a hint. When a hint occurs at a particular time instance, each other active controller 172 (e.g., the maneuver controller 200) considers the hint. When a controller 172 interprets the hint, the controller 172 may determine that the hint corresponds to joints J different from joints J that the controller 172 controls and ignore modifying its controller behavior for the hint. When the hint corresponds to the same joints J, the controller 172 may incorporate the behavior modification of the hint into its own behavior.

Referring to FIGS. 2A-2G, the maneuver controller 200 includes a problem generator 220 and a solver 230. The problem generator 220 may translate a maneuver 210 that the maneuver controller 200 receives into a format that enables the maneuver system 200 to perform movement controls that execute or attempt to execute the maneuver 210. In some examples, in order to execute the one or more maneuvers 210, the maneuver system 200 accounts for a current state 202 of the robot 100. More specifically, executing the maneuver 210 in a vacuum without accounting for the current state 202 of the robot 100 may significantly reduce the ability of the robot 100 to successfully execute the maneuver 210. Since the maneuver 210 is stateless, the problem generator 220 forms a problem 222 for the solver 230 by combining a maneuver 210 with a current state 202 of the robot 100. The problem 222 formed by the problem generator 220 may be solver-facing. As solver-facing, in some examples, the problem 222 may not be in a human-readable format and can instead be in a machine-readable format. Furthermore, since the problem 222 includes the current state 202 of the robot 100, the problem 222 is stateful.

In some implementations, the problem generator 220 generates a problem 222 that includes divisions of time. These divisions of time are referred to as time steps 224a-q. In comparing the maneuver 210 to the problem 222, the maneuver 210 may operate in movement events that may indicate when movement changes while the problem 222 may describe what to do during the time steps 224a-q. In some configurations, the time steps 224a-q may be a fixed size (e.g., fifty milliseconds). The size of the time steps 224a-q may correspond to the timing between movement events of the maneuver 210. For instance, the problem generator 220 determines a size of the time steps 224a-q by determining the time between each specified movement event. Once the problem generator 220 determines the time between each adjacent movement event, the lowest amount of time between movement events may become the fixed size of the time steps 224a-q or correspond to a multiple of the fixed size for the time steps 224a-q. The problem generator 220 may divide the maneuver 210 such that movement events occur at a boundary of a particular time step.

The problem generator 220 may divide a maneuver 210 into time steps 224a-q. Further, the problem generator 220 may recognize that too many time steps are computationally expensive. Due to these expenses, in some examples, the problem generator 220 may combine one or more time steps. In one approach to combine time steps, the problem generator 220 may generate time steps such that the time steps increase in size the further into the future for the maneuver 210. Further, the time steps may be longer in duration the further into the future. In some implementations, as the time steps get longer, the longer time steps may be integer multiples of the initial time step (e.g., the shortest basic time step unit). This approach may allow a maneuver 210 to have fine grain time instruction with the shortest basic time step unit in the immediate future and increasingly coarser grain time instruction the further into the future of maneuver(s) 210. In some configurations, the problem generator 220 communicates a maximum number of time steps to the solver 230. The maximum number of time steps may be predetermined (e.g., in order to maintain computational speeds of the solver 230). Although, the problem generator 220 may generate more than the maximum number of time steps and the solver 230 may function, the maximum number allows the solver 230 to, for example, maintain computational efficiency and timely throughput.

Figure 2A:
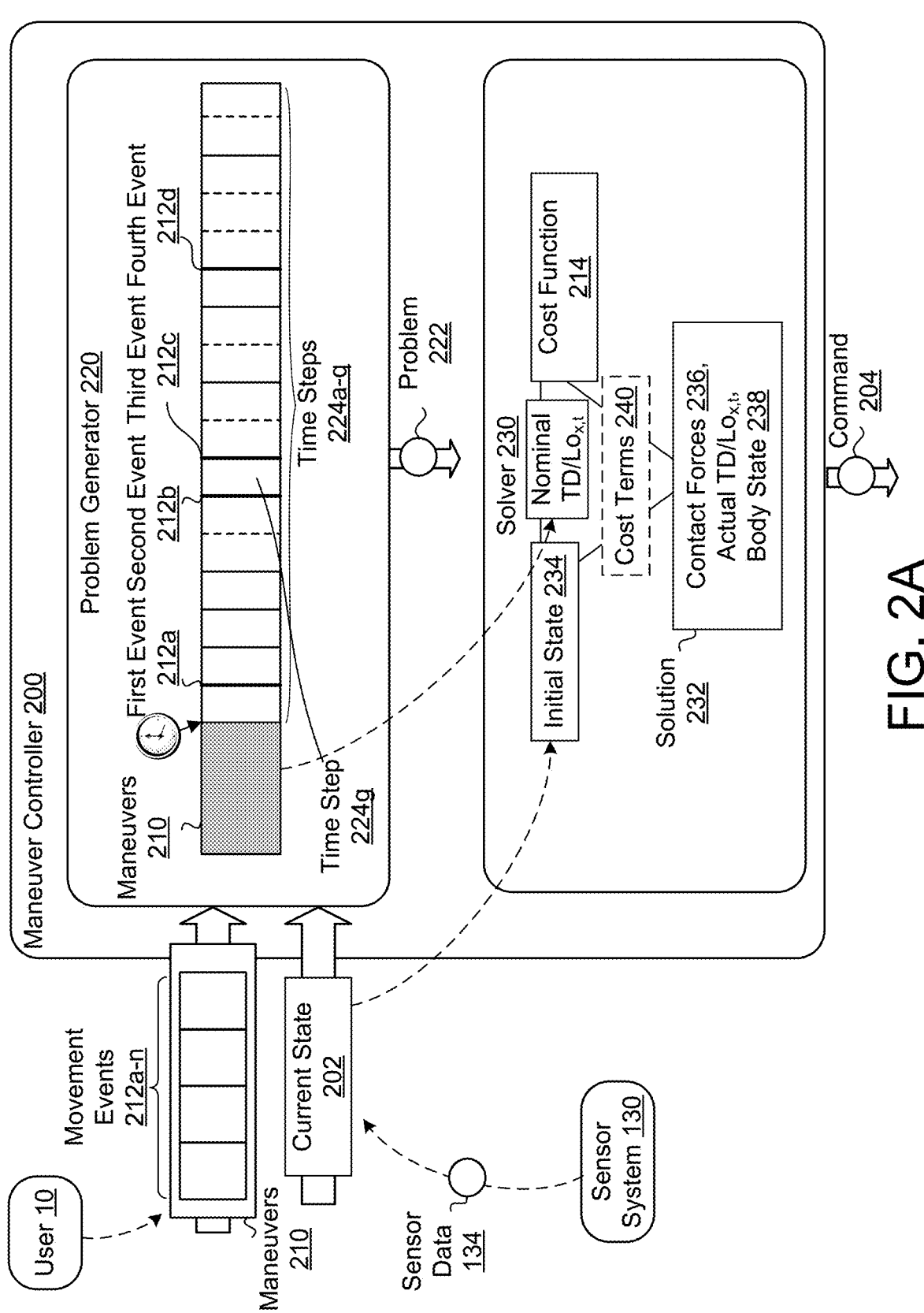
FIG. 2A is a schematic view of an example maneuver controller for the robot of FIG. 1A.

To illustrate, FIG. 2A depicts a maneuver 210 divided into time steps 224a-q. The maneuver 210 may include four events 212a-d where a first event 212a is a liftoff of a first leg of the robot, a second event 212b is a touchdown of the first leg, a third event 212c is a liftoff of a second leg of the robot, and a fourth event 212d is a touchdown of the second leg. In this example, close to the current time (as shown by the clock), the time steps 224a-q are a single time step unit in length for four time steps 224a-d, and then the next two time steps 224e-f are combined into a single time step (e.g., as shown by the dotted line). After the combined two time steps 224e-f, there is another single time step 224g followed by two more combined sets of two time steps, a first set of time steps 224h-i and second set of time steps 224j-k. After the second set of time steps 224j-k, there is another single time step 224l followed by a set of three time steps 224m-o. Subsequent to the set of three time steps 224m-o, the maneuver 210 ends with a set of two time steps 224p-q. In this example, the combination of time steps 224a-q may follow a pattern that there are four sets of a basic time step length followed by four sets of twice the basic time step length followed by four sets of three times the basic time step length. The pattern may be disrupted by movement events. Even though time steps 224a-q may be combined, the problem generator 220 maintains that there are time step boundaries at movement events. As shown in FIG. 2A, the single time step 224g may be part of a larger time step except that the second event 212b and the third event 212c form boundaries to the single time step 224g. In this scenario, if the single time step 224g was combined into a larger time step, one or both events 212b-c of the maneuver 210 may lack important time detail (e.g., that may be critical to the success of the maneuver 210).

Figure 2B:
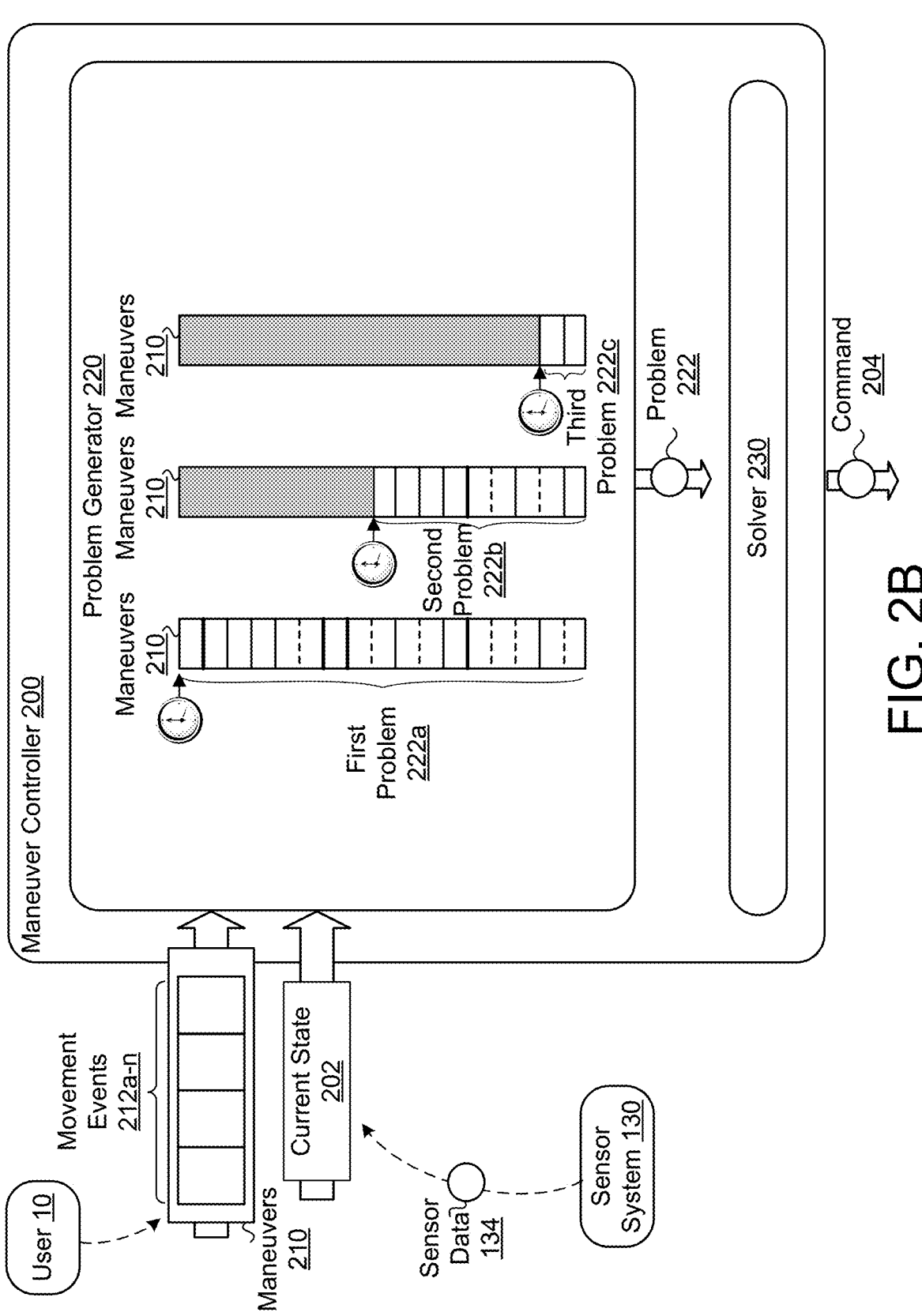
FIG. 2B is a schematic view of an example maneuver controller for the robot of FIG. 1A.
Figure 2C:
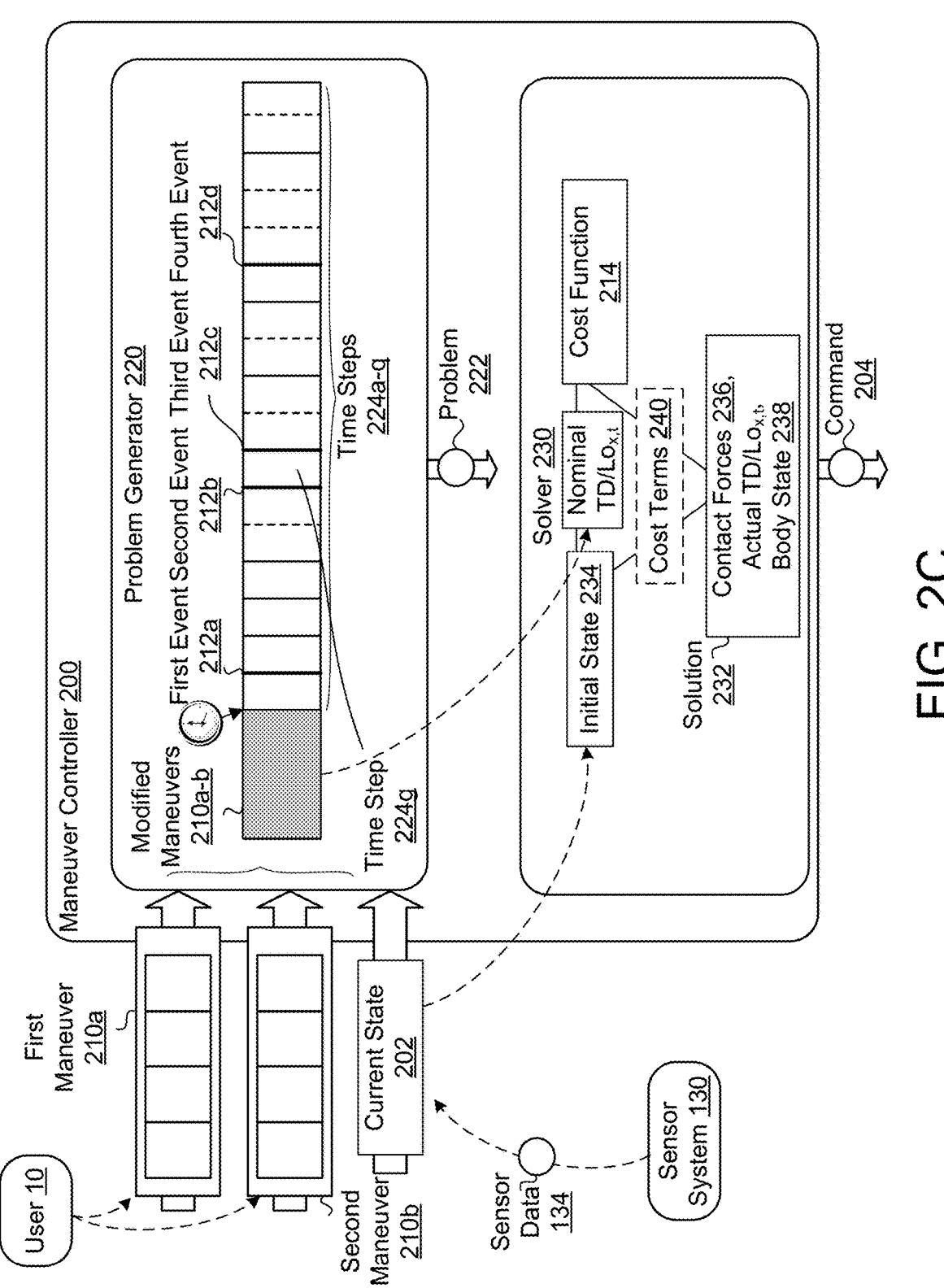
FIG. 2C is a schematic view of an example maneuver controller for the robot of FIG. 1A.

In some examples, unlike the maneuver 210, the problem 222 may change throughout the maneuver(s) 210. For instance, the problem 222 may change every time step. FIG. 2B is an example that depicts the problem generator 220 generating new problems 222 during the maneuver 210. The problem generator 220 may generate a first problem 222a for the entire maneuver 210. Partially through the maneuver 210, the problem generator 220 may generate a second problem 222b for the second half of the maneuver 210. When the solver 230 is a majority of the way through the maneuver 210 (e.g., 90% through the maneuver 210), the problem generator 220 generates a third problem 222c for the remaining portion of the maneuver 210 (e.g., the remaining 10%). By adapting the problem 222 to every change in time step, the problem generator 220 can ensure that the solver 230 addresses the most current problem.

In some cases, the problem generator 220 can determine whether to modify maneuver(s) 210 based on hints received at the maneuver controller 200. For instance, when the maneuver controller 200 receives a hint as a first maneuver 210a and a non-hint second maneuver 210b, the problem generator 220 determines whether the hint corresponds to joints J different from joints J that the maneuver controller 200 controls. When the hint corresponds to joints J different from joints J that the maneuver controller 200 controls, the maneuver controller 200 ignores modifying the movement behavior of the non-hint second maneuver 210b (not shown). Yet, when the hint corresponds to the same joints J, the problem generator 220 may incorporate the behavior modification of the hint 210a into the behavior of the second maneuver 210b (e.g., shown as a modified maneuver 210a-b). In some examples, the problem generator 220 identifies the joints J of a maneuver 210 based on the specification of each maneuver 210. The specification may identify which joints J are delegated to the maneuver 210.

In some examples, the problem generator 220 helps to resolve inconsistencies between the current state 202 of the robot 100 and the intended state of the robot 100. State differently, the current state 202 of the robot 100 may vary from the intended state of the robot 100 such that this variance may cause issues for the solver 230 to accurately identify behavior controls for the maneuver controller 200. For example, according to the maneuver 210 and the clock of the robot 100, the robot 100 may have two legs on the ground surface 12 although the measured state (e.g., the current state 202) reflects that the robot 100 may have a first leg in the air (e.g., as a swing leg) that has not touched down yet (e.g., a late touchdown). The problem generator 220 by incorporating the current state 202 of the robot 100 may ensure that the solver 230 does not falsely determine a solution 232 that does not consider the late touchdown that the current state 202 identifies. Similar to a late touchdown, the problem generator 220 also may identify (e.g., by the current state 202) that a leg of the robot has an early touchdown.

With continued reference to FIGS. 2A-2F, the solver 230 can receive the problem 222 from the problem generator 220 and output a solution 232 to the problem 222. In some examples, the solver 230 identifies an initial state 234 of the robot 100 based on the current state 202 incorporated into the problem 222. For instance, when the maneuver controller 200 is predominantly handling movements for a legged robot 100, the initial state 234 includes which feet of the robot are currently in contact with the ground surface 12 and where the feet are in contact with the ground surface. The initial state 234 may also include initial dynamics of the body 110 of the robot 100 such as a position of the body 110, velocity of the body 110, and/or an orientation of the body 110. In some examples, from the maneuver 210 incorporated into the problem 222, the problem 222 includes nominal liftoff and/or touchdown times as well as nominal liftoff and/or touchdown locations (e.g., shown as $TD/Lo_{x,t}$). The term nominal may designate that the liftoff/touchdown times and liftoff/touchdown locations are targets specified by the maneuver 210 (e.g., from the user 10 who authored the maneuver 210). In these examples, the maneuver 210 may also specify a contact normal that defines a direction of the contact surface (e.g., ground surface 12). With the contact normal, the robot 100 (e.g., at the solver 230) may be able to determine a friction cone that identifies how different forces may be applied to the contact surface without slipping or having a threshold risk of slipping. The solver 230 also receives, as part of the problem 222, a cost function 214 (e.g., specified at by the maneuver 210). The cost functions 214 refers to an identification of a final pose $P_F$ for the maneuver 210 and/or a value designating the importance of this final pose $P_F$. In some examples, the cost function 214 is more complicated such that the maneuver 210 has multiple poses P of different importance at different times within the maneuver 210 that are incorporated into the problem 222 for the solver 230.

Based on these inputs, the solver 230 generates the solution 232. As part of the solution 232, the solver 230 determines contact forces 236 to perform the maneuver 210. In some examples, in addition to the contact forces 236, the solution 232 includes actual touchdown/liftoff timing and/or actual touchdown/liftoff locations. The touchdown/liftoff timing and the touchdown/liftoff locations may be referred to as actual because the solver 230 may adjust the nominal liftoff/touchdown times and liftoff/touchdown locations based on optimization of the solver 230. In some instances, the solution 232 includes touchdown/liftoff timing, but only touchdown locations. By being able to adjust the nominal inputs, the robot 100 may be more robust since the robot 100 may adapt to feedback from the environment 30 (e.g., something bumps the robot 100) or disturbances in the behavior (e.g., stumbling or tripping). Additionally or alternatively, being able to adjust the timing and/or the location of a touchdown allows movement events of a maneuver 210 to be more easily authored without concern for precise inputs as to timing or location (e.g., for all or a portion of the legs of the robot 100). Stated differently, the user 10 may author a behavior (e.g., create a maneuver 210) that is approximately feasible and the solver 230 may determine a solution 232 that is actually feasible. Indirectly speaking, the solver 230 may also determine COM for the robot 100 and an orientation trajectory for the robot 100. The solver 230 may indirectly determine the COM and orientation trajectory because these values may be derived from the solution's contact forces 236 and forward dynamics. Forward dynamics may refer to using forces (or torques) of a body to predict orientations for each part of the body. Based on the structural relationships of the robot 100 and determining the contact forces 236 to perform the maneuver 210, forward dynamics can predict dynamics and/or kinematics for the robot 100 during the maneuver 210. Alternatively, solver 230 may model the robot body 110 as having a single part.

The solver 230 attempts to determine orientations for the robot 100 where the orientations are torque-based solutions 232 for the problem 222. By seeking a torque-based solution, the solver 230 focuses on torques for the robot 100 measured as a force multiplied by a position vector. If the solver 230 is attempting determine one of these terms (e.g., either the force or the position vector), the solver 230 may utilize a quadratic program (QP) where the solution process would be linear. Unfortunately, since the solver 230 is attempting to optimize both an unknown force term and an unknown position vector term (e.g., a quadratic term), the solver 230 cannot rely on a traditional QP in its basic form. Instead, the solver 230 linearizes the problem.

In some implementations, the solver 230 is attempting to simultaneously determine a solution for a location of the body 110 relative to a foot of the robot (e.g., the position vector term) and also the forces at the foot (e.g., the force term). As the solver 230 is trying to solve for both of these variables, the problem 222 may be a nonlinear optimization problem (e.g., a quadratic problem) rather than linear optimization problem. Normally, this means that the solver 230 cannot optimize with a QP. Yet other, more general, optimization methods are not as effective as a QP because more general solvers (e.g., a sequential quadratic program) cost a significantly greater amount of time and therefore would not enable the robot 100 to meet speed requirements that allow the robot 100 to be reactive or even proactive in terms of balance or robot physics when performing a maneuver 210. To overcome this problem, the solver 230 linearizes the dynamics by making some assumptions to transform the problem 222 from a nonlinear optimization problem (e.g., a quadratic problem) to a linear optimization problem. To explain the transformation, the solver 230 wants to determine a moment that is the product of two variables (e.g., force and a position vector) without actually being able to multiple the variables together. In some examples, the solver 230 represents the product of these two variables as a linear representation that is inaccurate. Yet the solver 230 represents this inaccuracy by the product of how wrong a guess or estimate is for each variable. Therefore, as the guesses for each variable improve, the inherent error (e.g., the inaccuracy of the linearization) shrinks.

In some implementations, the solver 230 may determine contact forces 236 for all or a portion of the legs of the robot 100 in contact with the ground surface 12 at all or a portion of the time steps 224a-q. A contact force 236 may be a three-dimensional force (e.g., may include force components in the x, y, and/or z direction). For all or a portion of the time steps 224*a*-*q*, the solver 230 may assume that the contact forces 236 are a Piecewise Constant. The solver 230 may assume that the contact forces 236 do not change during a particular time step. In some configurations, the solver 230 defines a body state 238 of the robot 100 as the COM position of the robot 100, the COM velocity of the robot 100, orientation of the robot 100 (e.g., based on Euler angles or quaternions), and an angular velocity of the robot 100 in a world reference frame. As the solver 230 determines the contact forces 236, the solver 230 may use forward dynamics to determine what the body state 238 will be at each time step of a maneuver 210.

In some examples, the body state 238 of the robot 100 defined by the solver 230 is a simple rigid body model for the robot 100. The solver 230 may not consider the robot 100 to be a legged robot 100 with articulable jointed legs that may be coupled to the body 110 of the robot 100. By modeling the robot 100 as a simple rigid body, the body state 238 determined by the solver 230 may have some inaccuracies. For example, since the robot 100 is more complicated than a simple rigid body, the dynamics of the robot 100 derived from the body state 238 of the robot 100 are likely to have some degree of inaccuracy while the kinematics of the robot 100 may be fairly accurate. In some examples, instead of defining the orientation of the robot 100 for the body state 238 in terms of a rigid body, the orientation of the robot 100 is defined in terms of a natural posture for the robot 100 where the natural posture accounts for additional inertial bodies of the robot 100 (e.g., the jointed legs, the arm 126, the members of the arm 126, etc.). By using the natural posture, there may be a tradeoff between an increased degree of accuracy for the dynamics for the robot 100 (e.g., motion of the legs), but a decreased degree of accuracy with respect to the kinematics of the robot 100 (e.g., accuracy as to where the hip joints $J_H$ are located on the robot 100). In some configurations, the solver 230 uses machine learning (e.g., a neural network) to blend the advantages of each approach. For instance, the solver 230 defines the orientation for the body state 238 of the robot 100 in terms of natural posture, but uses machine learning to determine offsets to the kinematics such that the dynamics of the robot 100 are still accurate and the accuracy of the kinematics for the robot 100 using natural posture increases.

In some examples, the solution 232 from the solver 230 includes adjustments to the timing of a touchdown and/or adjustments to a location of a touchdown. For instance, at the maneuver 210, a user 10 specifies whether a timing of a touchdown and/or a location of a touchdown are adjustable. When the user 10 specifies that the timing of a touchdown and/or a location of a touchdown may be adjusted, the solver 230 may determine these adjustments (e.g., if optimization indicates adjustments) as part of the solution 232.

Figure 2D:
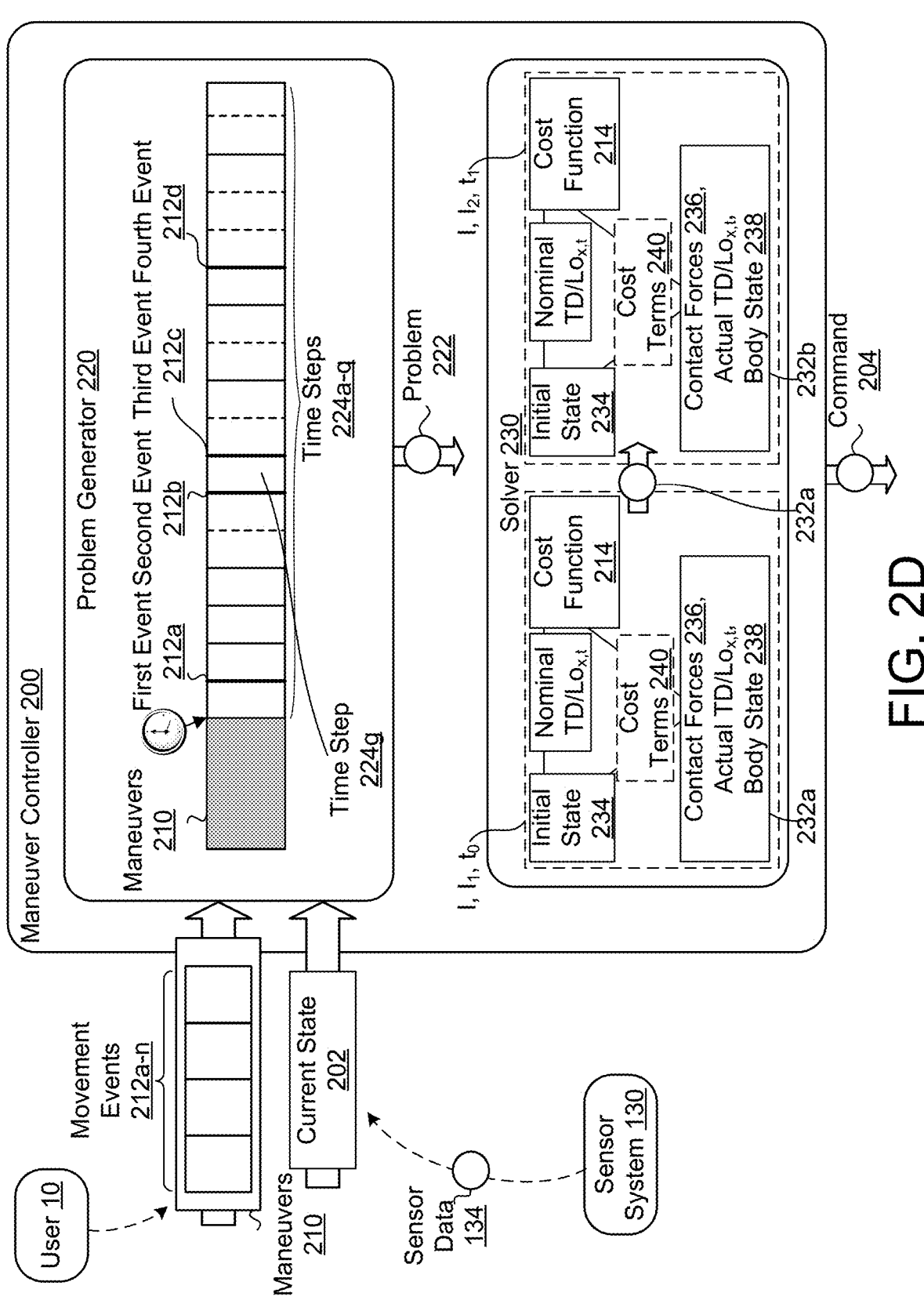
FIG. 2D is a schematic view of an example maneuver controller for the robot of FIG. 1A.

Referring to FIG. 2D, in some examples, the solver 230 iteratively generates one or more solutions 232. The solver 230 may iteratively generates solutions 232 and the problem 222 may change for each iteration I. This approach is in contrast to a more general solver, such as a sequential QP. When a sequential QP solves a QP, the sequential QP uses its solution to re-linearize and to solve the same QP. Although this is an iterative-based approach, the sequential QP may not allow the optimization problem to change between re-solves. In the case of the solver 230, when the solver 230 initially solves a QP at a first iteration I, $I_1$, the first solution 232*a* may not correspond to an accurate solution 232 because of assumptions made to transform the problem 222 from a nonlinear optimization problem (e.g., a quadratic problem) to a linear optimization problem. Due to the transformation from the nonlinear optimization problem (e.g., a quadratic problem) to the linear optimization problem, however, the linearization error that makes the first solution 232*a* an inaccurate solution is quadratic such that the error can be iteratively reduced to converge on an accurate solution. Therefore, in order to generate a more accurate solution than the first solution 232*a*, the first solution 232*a* is fed back into solver 230 as a guess to linearize for the next iteration I, $I_2$ of the problem 222. The problem may change 222 at each iteration I because the problem 222 may account for the current state 202 of the robot 100 and the current state 202 may update for any passage of time. There may be a time period between iterations I of the problem 222 (e.g., the problem 222 is attempted to be solved every tick t of a time clock for the robot 100) and the problem 222 may change for the solver 230. By using the solution of a prior iteration I as a linearization estimate for the current iteration I, the solver 230 shrinks the error over each iteration I to converge on an accurate solution. The quality of the solution may be measured by comparing the solution (e.g., at each iteration I) to an integrated solution 232*i*. The solver 230 generates the integrated solution 232*i* by running the solution through forward dynamics for the robot 100. To illustrate, often the first solution 232*a* from the solver 230 is a poor solution because the linearization occurred around an initial point with minimal to no knowledge as to how accurate of a solution that the initial point would provide for the solver 230. A second solution 232*b* then becomes more accurate because the linearization occurs around the first solution 232*a* with a known accuracy. Often times, a second solution 232*b* has an accuracy that is usable for behavior control by the maneuver controller 200, but subsequent solutions, such as a third solution 232*c* or a fourth solution 232*d*, may be more accurate for behavior control by the maneuver controller 200 as compared to prior solutions.

In some implementations, the solver 230 linearizes the dynamics, which produces a problem with a quadratic cost function, which the solver 230 can formulate as a QP and solve with a QP solver. Had the solver 230 been unable to linearize the dynamics, the cost function would have been more complicated or higher order than quadratic. That cannot be formulated as a QP and can therefore not be solved by a QP solver. One example of a general solver that can solve such problems is called sequential quadratic programming (SQP). The SQP can solve a QP and using the solution to re-linearize a new QP. So, in some instances, the solver 230 can execute an SQP solver for the original non-linear problem while allowing the non-linear problem to change between QP iterations. Moreover, the re-linearized solutions keep changing, rather than starting over once finished.

In some cases, the solver 230 may determine which solution iteration provides sufficient accuracy to control movement for a maneuver 210 by determining that a comparison between the integrated solution 232*i* and any respective solution satisfies an optimization threshold. The optimization threshold may be a predetermined degree of accuracy that indicates that the solution has a likelihood of success to perform the maneuver 210. In some examples, the comparison is a different comparison. In other examples, the comparison is a ratio comparison (e.g., much like a percent yield).

In some implementations, the QP of the solver 230 is a cost function and some number of linear constraints. The solver 230 attempts to satisfy these cost constraints in order to achieve optimization for the problem 222. These cost constraints may be user specified at the maneuver 210, universal to the solver 230, and/or other settings controllable by an entity (e.g., the user 10). In some examples, the solver 230 includes a cost term 240 to minimize contact forces 236. Another example of a cost term 240 is that the solver 230 attempts to achieve a target pose $P_T$ where the target pose $P_T$ has an associated value (e.g., assigned cost of importance). The target pose $P_T$ may occur solely at the end of the movement trajectory of the maneuver 210 (e.g., as the final pose $P_F$) or a target pose $P_T$ may occur at other times within the maneuver 210 (e.g., at each time step or one or more designated time steps). Other potential cost terms 240 for the solver 230 include a maximum and/or a minimum deviation from nominal touchdown timing and/or nominal touchdown locations. The cost terms 240 may dictate an importance of the location and/or the timing for touchdowns for the user 10. Additionally or alternatively, the user 10 may include a cost term 240 that specifies the hip position with respect to the foot. The problem 222 may also be configured such that the user 10 may include custom cost terms 240 (e.g., custom movements). For example, the user 10 dictates a cost term 240 indicating for the robot 100 to jump as high as possible or lean as far as possible to a particular direction. In some configurations, the solver 230 includes a cost term 240 to minimize joint torques (or maximize joint torques) for the joints J used for a maneuver 210. Although these cost terms 240 are each described separately, the solver 230 may be subject to one or more of these cost terms 240 (e.g., in any combination).

Constraints can be either inequality or equality constraints. In some examples, the solver 230 includes friction constraints 240$f$ (e.g., as inequalities). Since the contact forces 236 are optimization variables for the solver 230, the friction constraints 240$f$ may be directly written to depend on these optimization variables. The configuration of the friction constraints 240$f$ may resemble a function with a conical shape or a pyramid shape (e.g., a four-sided three-dimensional pyramid). To implement the friction constraints 240$f$ as a cone, the solver 230 may use iterative constraints (e.g., the leg length constraints). In some of these examples, the function of the friction constraints 240$f$ accommodates for controllers 172 that have slight inaccuracies (e.g., at small force values) by having a minima of the function be a positive non-zero number.

In some implementations, the solver 230 uses iterative constraints 240$i$. Iterative constraints 240$i$ refer to constraints that capitalize on a feature of the solver 230 where the solver 230 may add additional constraints and continue solving or perform a quick solution 232 without restarting the problem 222. Iterative constraints 240$i$ may be useful when a constraint may be expressed as a non-linear function, but the type of constraint may be incompatible with the QP of the solver 230. Instead of trying to represent a non-linear function as an approximation of several individual linear constraints, the solver 230 first generates a solution 232 without the iterative constraints 240$i$. This solution 232 is then inspected to determine whether the solution 232 would violate a target non-linear constraint. When the solver 230 identifies that the solution 232 would violate a target non-linear constraint, the solver 230 may generate an iterative constraint 240$i$. The iterative constraint 240$i$ may constrain the solution 232 as a linear constraint that is compatible with the solver 230 as the solver 230 solves the problem 222. By solving the problem without the non-linear constraint first, the solver 230 may better determine what linear approximation of the non-linear constraint will be most accurate.

Figure 2E:
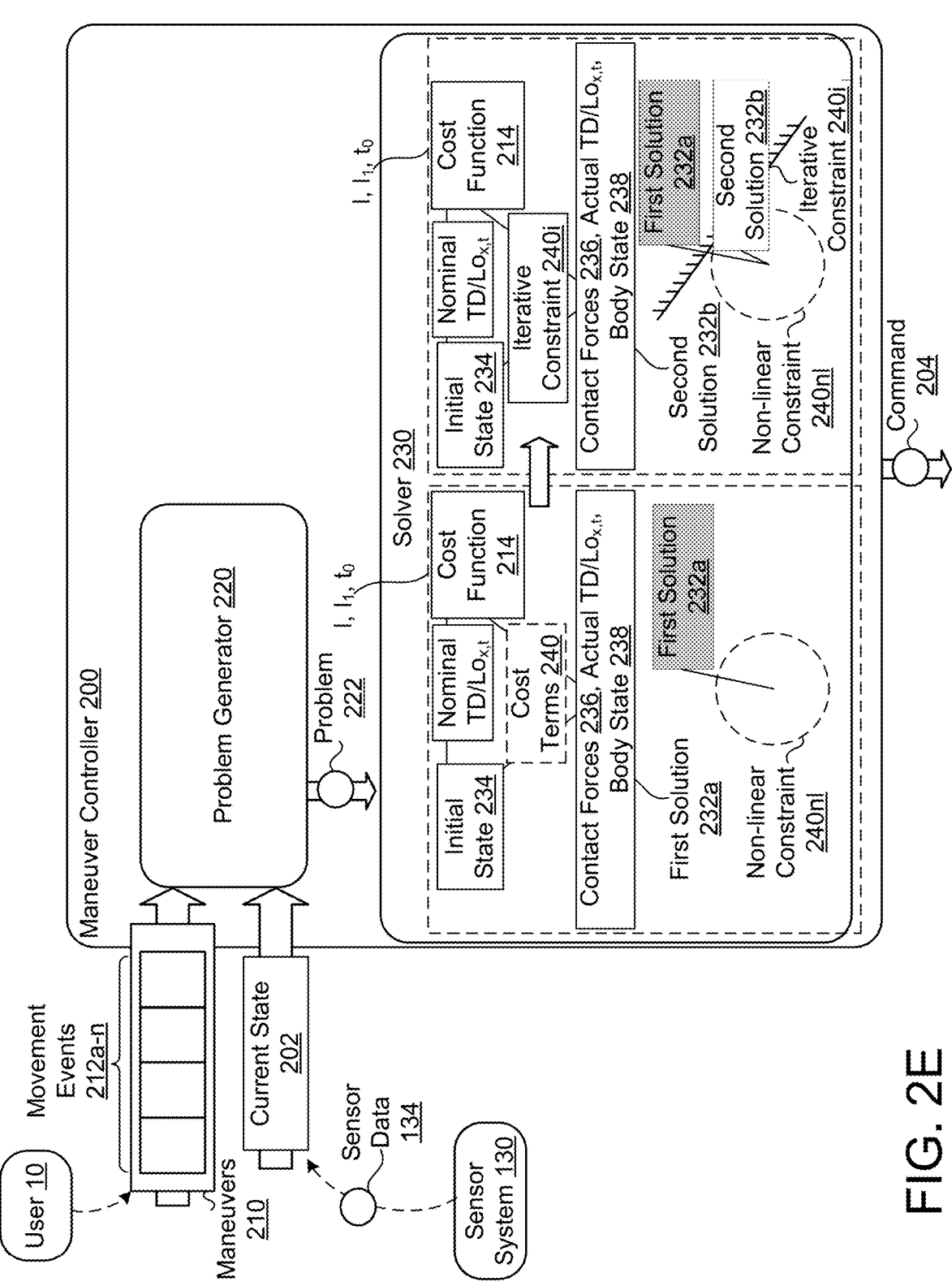
FIG. 2E is a schematic view of an example maneuver controller for the robot of FIG. 1A.
Figure 2F:
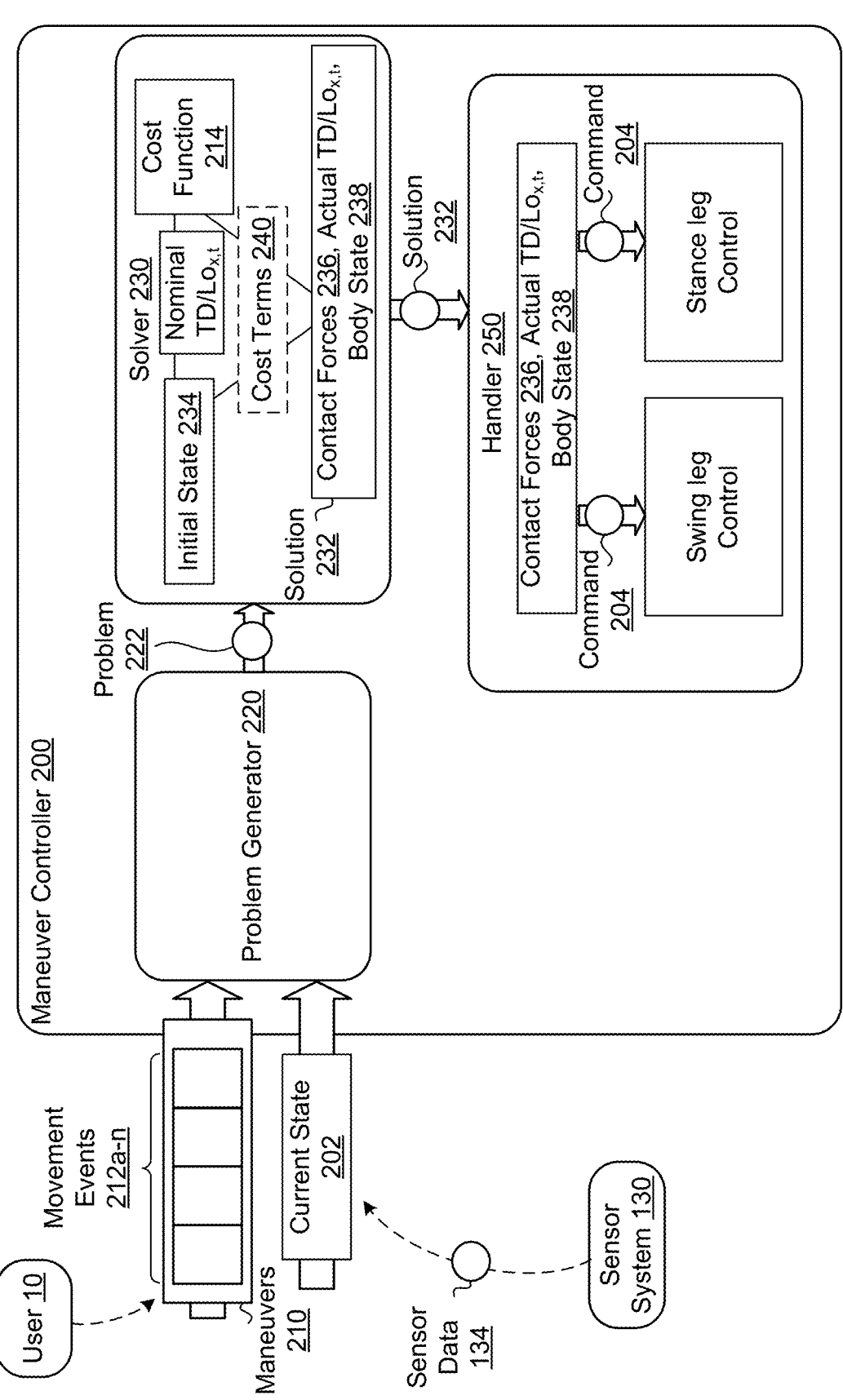
FIG. 2F is a schematic view of an example maneuver controller for the robot of FIG. 1A.

For example, FIG. 2E illustrates a dotted circle that represents a leg length constraint where a length of a leg of the robot 100 may be constrained as a function of the position of a hip (e.g., hip joint $J_H$) of the robot 100. Further, as long as a position of the hip joint $J_H$ is within the dotted circle, the robot 100 may satisfy the leg length constraint. The dotted circle may be a non-linear constraint 240$nl$. The solver 230 may generate a first solution 232$a$ for the robot 100 (e.g., shown as a first box) and identifies that this first solution 232$a$ would violate the non-linear constraint 240$nl$ of the dotted circle that represents a position of the hip of the robot 100. Due to this violation, the solver 230 generates an iterative constraint 240$i$ that is shown as a line tangent to a point on the circle near the first solution 232$a$. With the iterative constraint 240$i$, the solver 230 generates a second solution 232$b$ (e.g., shown as a second box) with some portion of the second solution 232$b$ within the non-linear constraint 240$nl$ of the dotted circle. The first solution 232$a$ and the second solution 232$b$, may occur during the same QP iteration $I_1$, $t_0$ such that the solver 230 does not re-linearize the problem 222 (e.g., the solution 232$a$-$b$ occur at the same tick $t_o$). The iterative constraint 240$i$ functions as an add-on constraint during a linearization iteration I. An iterative constraint 240$i$ may occur in an iteration within a given problem 222 while a linearization iteration occurs when the solver 230 solves the problem 222 at a new or subsequent future time (e.g., subsequent tick $t_1$). The solver 230 may include constraints as to a maximum leg length or a minimum leg length.

Another example of a constraint for the solver 230 is a hip constraint 240$h$. A hip constraint 240$h$ may be that an upper member 128$_U$ of all or a portion of the legs of the robot has a limited range of motion to rotate at the hip joint $J_H$ about the y-direction axis $A_Y$ in the X-Z frontal plane (also referred to as a body plane). Over rotation of the upper member 128$_U$ would cause an impact or interference with the body 110 of the robot 100. In some implementations, the hip constraint 240$h$ is represented as a line in the X-Z frontal plane that constrains the foot position for a foot of the robot 100 that corresponds to the leg with the upper member 128$_U$. By constraining a X-Z position of the foot position, the upper member 128$_U$ may not cause over rotating issues.

In some examples, there are constraints on the timing and/or the position of liftoff/touchdown. Although the user 10 may specify that the solver 230 is able to adjust the timing of a touchdown/liftoff and/or a location of a touchdown/liftoff, these adjustments may include constraints that identify a range or extent for these adjustments. For instance, a constraint for the touchdown location is represented as a polygonal region where the polygonal region represents a legal touchdown area.

Utilizing the solution 232, the maneuver controller 200 may perform the behavior (e.g., an optimized version of the behavior) corresponding to the maneuver 210 of the problem 222. The maneuver controller 200 may translate the solution 232 into one or more commands 204 to perform the maneuver 200. For instance, the maneuver controller 200 generates a command 204 that controls one or more joints J corresponding to the maneuver 210 to perform the maneuver 210 (e.g., referred to as a joint command 204). The command 204 may assign joint torques $T_J$ to the joints J based on the solution 232 from the solver 230. Additionally or alternatively, the command 204 may assign desired positions/velocities to joints J. In general, stance legs are torque-controlled, but swing legs are position-controlled.

Figure 2G:
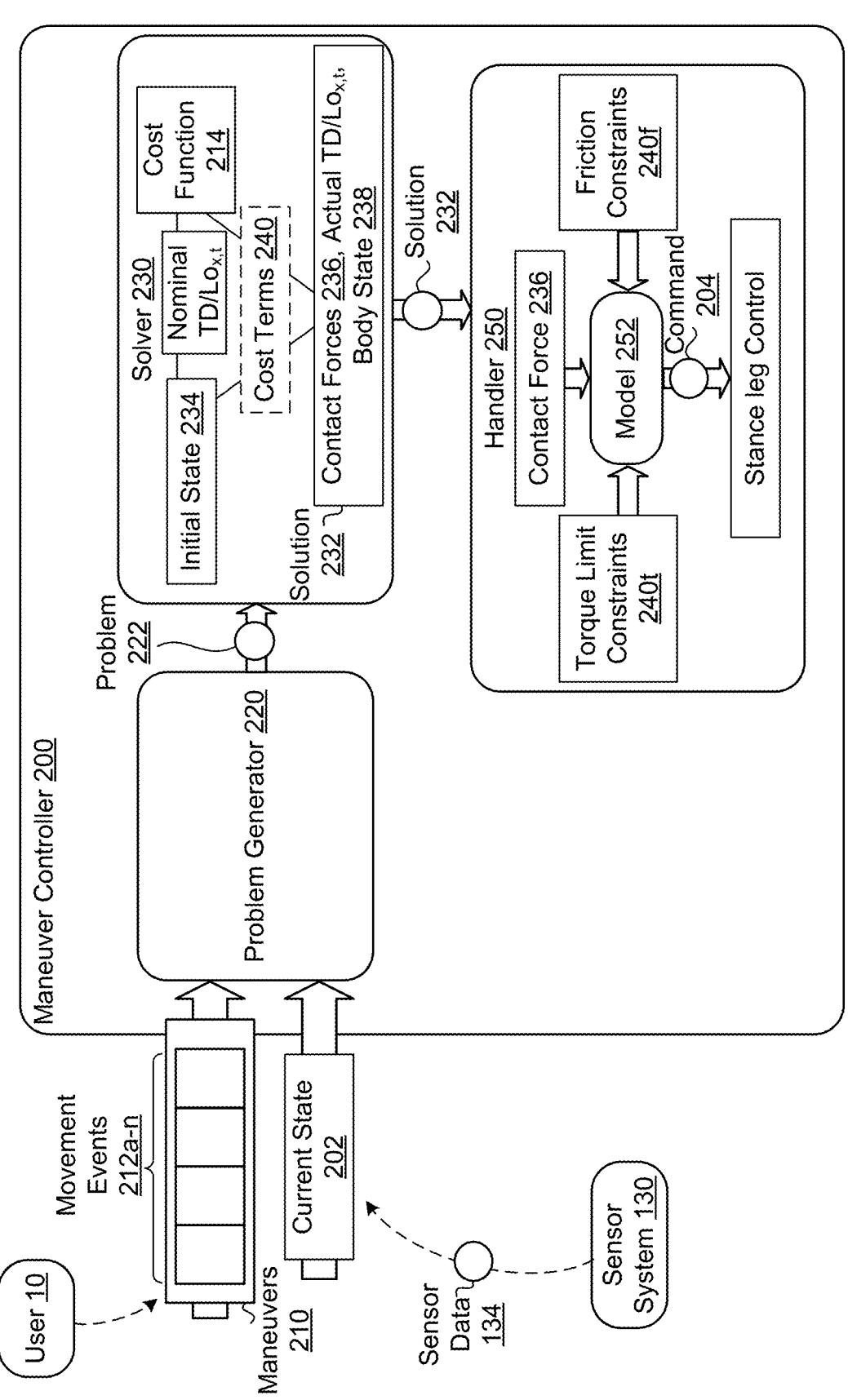
FIG. 2G is a schematic view of an example maneuver controller for the robot of FIG. 1A.

In some implementations, for a legged robot 100, the maneuver controller 200 performs the behavior by handling a stance leg(s) of the robot 100 and/or a swing leg(s) of the robot 100. To perform handling of the legs, the maneuver controller 200 may have different protocols to apply the solution 232 to the stance leg and/or the swing leg. In some configurations, such as FIGS. 2F-2G, to translate the solution 232 from the solver 230 to actual movement control, the maneuver controller 200 also includes a handler 250. In some cases, the handler 250 may identify the contact force(s) 236, the touchdown location(s), and/or the touchdown timing from the solution 232 and implement these parts of the solution 232 to control the stance legs and/or the swing legs. In these configurations, the handler 250 receives the following as inputs: the contact forces 236 from the solution 232 as target forces for the stance leg; torque limit constraints 240t for joints J of the stance leg; and the friction constraints 240f. Based on these inputs, the handler 250 determines joint torques $T_J$ to apply at joints J of the stance leg. In some configurations, in order for the handler 250 to control one or more stance legs of the robot 100 based on the solution 232, the handler 250 may include an optimization model 252, such as a QP, that receives the inputs and determines the joint torques $T_J$ to apply at joints J of the stance leg (e.g., as shown in FIG. 2G). By using the handler 250, the maneuver controller 200 may ensure that constraints that may have been violated or partially violated at the solver 230 (e.g., by tradeoffs at the solver 230) are actually accounted for when controlling one or more stance legs. Otherwise, actual control may be problematic for achieving the maneuver 210 and/or maintaining balance during the maneuver 210. To illustrate, the solver 230 may determine a contact force 236 that obeys the friction constraints, but does not obey the torque limit constraints 240t. In this example, if the handler 250 considered the torque limit constraints 240t, but not the friction constraints 240f, the handler 250 may modify the joint torque $T_J$ to comply with the torque limit constraints 240t and violate the friction constraints 240f during actual control of the stance leg. To overcome these issues, the handler 250 can duplicate constraints to ensure optimal actual control for the robot 100. The handler 250 may include an individual optimization model for each leg of the robot 100 or may include a larger optimization model for multiple legs that is capable of allocating joint control between more than one leg (e.g., to compensate for deficiencies between legs).

The swing legs may be controlled by the maneuver controller 210 (e.g., by the handler 250) in a variety of ways based on the solution 232 from the solver 230 (e.g., based on the touchdown position and/or the touchdown timing of the solution 232). In some examples, the maneuver controller 210 controls the swing legs according to the specification of the maneuver 210. For instance, the user 10 specifies waypoints in the maneuver 210 where a swing leg targets for a touchdown. The waypoints specified by the maneuver 210 may be specified according to time or according to position. In the case where the user 10 specifies the waypoint in terms of position, the maneuver controller 200 may determine timing corresponding to that position. In some cases, the maneuver controller 200 can use the solution 232 to command swing leg movement such that the swing leg touches down on vertical surface (e.g., a surface with significantly non-vertical normal) rather than a relatively horizontal surface (e.g., the ground surface 12). In some configurations, the maneuver controller 200 employs the swing leg control techniques, as described in U.S. Application No. 62/883, 502, filed Aug. 6, 2019, titled "Leg Swing Trajectories," which is hereby incorporated by reference, to control one or more swing legs of the robot 100 based on the solution 232 from the solver 230.

In some implementations, the solver 230 can take a variable amount of time to complete. Moreover, the solver may be time intensive if there are many active constraints. The maneuver controller 200 may handle that by canceling execution of the solver 230 for the solution 232 and using an only partially optimized solution 232 having a shorter execution time. Moreover, since the solver 230 may rely on linearizing around a previous solution, the solver 230 may can take several iterations to converge during which time bad solutions 232 may occur. The solver 230 knows, however, when this is happening by using the measure of how well the linearization is doing. In response, the control system 170 may specify a backup controller 172, 200 that may not be quite optimal, but is acceptable for the few timesteps (e.g., typically <10 ms) required for the desired controller 172, 200 to converge. The control system 170 may continue doing whatever it was doing previously by specifying that controller 172 as the backup controller 172.

FIG. 3 is an example arrangement of operations for a method 300 of dynamically planning at least one maneuver. At operation 302, the method 300 receives a maneuver for the robot and a current state of the robot where the maneuver includes one or more movement events for the robot to perform. At operation 304, the method 300 transforms the maneuver and the current state of the robot into a nonlinear optimization problem where the nonlinear optimization problem can optimize an unknown force and an unknown position vector. At operation 306, the method 300 performs two sub-operations 306, 306a-b at a first time instance. At sub-operation 306a, the method 300 linearizes the nonlinear optimization problem into a first linear optimization problem. At sub-operation 306b, the method 300 determines a first solution to the first linear optimization problem using quadratic programming. At operation 308, the method 300 performs two sub-operations 308, 308a-b at a second time instance where the second time instance is subsequent to the first time instance. At sub-operation 308a, the method 300 linearizes the nonlinear optimization problem into a second linear optimization problem based on the first solution at the first time instance $t_0$. At sub-operation 308b, the method 300 determines a second solution to the second linear optimization problem based on the first solution using the quadratic programming. At operation 310, the method 300 generates a joint command to control motion of the robot during the maneuver based on the second solution.

In some examples, the method 300 also determines an integrated solution based on the second solution and forward dynamics for the robot and determines that a comparison between the integrated solution and the second solution satisfies an optimization threshold where the optimization threshold indicates a degree of accuracy for a respective solution to generate a joint command. In some implementations, the method 300 further determines that the second solution fails to satisfy a nonlinear constraint and generates an iterative constraint for the second linear optimization problem where the iterative constraint includes a linear constraint based on the failure of the second solution to satisfy the nonlinear constraint. The method 300 may also include updating the second solution to the second linear optimization problem using the quadratic programming where the quadratic programming includes the iterative constraint.

Figure 4:
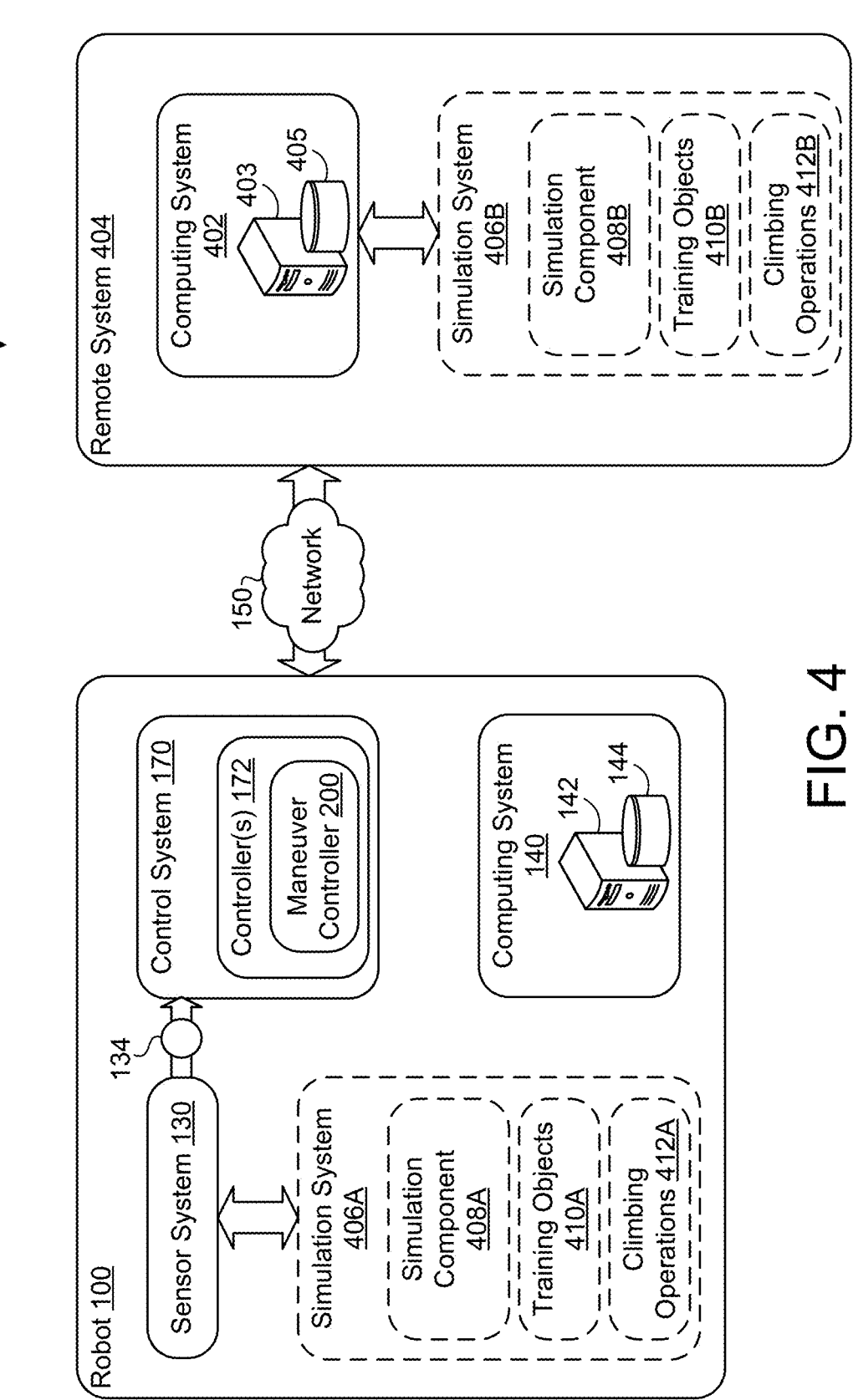
FIG. 4 is a schematic view of an example maneuver controller for the robot of FIG. 1A.

Referring now to FIG. 4, the robot 100 may be similar to and/or may incorporate features of the robot 100 discussed above with respect to FIG. 1A and FIG. 1B. Further, the remote system 404 may be similar to and/or may incorporate features of the remote system 160 discussed above with respect to FIG. 1B.

As discussed above and shown in FIG. 4, the robot 100 includes a sensor system 130, a control system 170, and a computing system 140. Further, the remote system 404 includes a computing system 402. The computing system 402 includes data processing hardware 403 and memory hardware 405. The data processing hardware 403 may execute instructions stored in the memory hardware 405 to perform computing tasks related to activities (e.g., implementation of a simulation system) for the robot 100. The computing system 402 may be one or more locations of data processing hardware 403 and/or memory hardware 405.

All or a portion of the robot 100 and the remote system 404 may include a simulation system. For example, as shown in FIG. 4, the robot 100 includes a simulation system 406A and the remote system 404 includes a simulation system 406B. In some cases, one or more of the robot 100 or the remote system 404 may not include a simulation system. For example, the robot 100 may include the simulation system 406A and the remote system 404 may not include a simulation system.

In the example of FIG. 4, the simulation system 406A includes a simulation component 408A, training objects 410A, and climbing operations 412A. Further, the simulation system 406B includes a simulation component 408B, training objects 410B, and climbing operations 412B. The simulation components 408A and 408B can include and/or implement one or more machine learning models (e.g., neural networks) to identify a particular climbing operation for a particular training object. For example, the simulation components 408A and 408B can include and/or implement a deep neural network(s).

The simulation systems 406A and 406B may generate training objects 410A and 410B. The simulation systems 406A and 406B may generate training objects 410A and 410B based on particular characteristics (e.g., heights). For example, all or a portion of the simulation systems 406A and 406B may determine a plurality of characteristics and generate a training object for all or a portion of the plurality of characteristics. In some embodiments, the training objects 410A and 410B may be a dynamic set of training objects (e.g., a continuously variable set of training objects). For example, the training objects 410A and 410B may be continuously updated to include all boxes within a particular range of dimensions.

In some cases, the simulation systems 406A and 406B may generate the training objects 410A and 410B based on sensor data. For example, the simulation systems 406A and 406B may obtain sensor data from one or more sensors (e.g., one or more sensors of a robot). Further, the simulation systems 406A and 406B can obtain sensor data from one or more sensors of one or more robots. For example, the simulation systems 406A and 406B can obtain a first portion of the sensor data from a first sensor of a first robot, a second portion of the sensor data from a second sensor of the first robot, a third portion of the sensor data from a first sensor of a second robot, etc.

In some embodiments, the simulation systems 406A and 406B can obtain different portions of the sensor data from sensors of the robot having different sensor types. For example, the sensors of the robot may include a LIDAR sensor, a camera, a LADAR sensor, etc. In some cases, the simulation systems 406A and 406B can obtain sensor data from one or more sensors that are separate from the one or more robots (e.g., sensors of an external monitoring system).

The sensor data may include point cloud data. For example, the sensor data may identify a discrete plurality of data points in space. All or a portion of the discrete plurality of data points may represent an object and/or shape. Further, all or a portion of the discrete plurality of data points may have a set of coordinates (e.g., Cartesian coordinates) identifying a respective position of the data point within the space.

Based on the sensor data, the simulation systems 406A and 406B may identify one or more objects in the environment of the robot. Further, the simulation systems 406A and 406B may identify characteristics of the one or more objects. For example, the simulation systems 406A and 406B may identify a height associated with all or a portion of the one or more objects. Based on the identified characteristics, the simulation systems 406A and 406B can generate the training objects 410A and 410B that each correspond to and/or are based on a particular identified object. Therefore, the simulation components 408A and 408B can obtain the training objects 410A and 410B.

The simulation components 408A and 408B can obtain robot parameters defining a simulated robot (e.g., a state of the simulated robot). In some cases, the simulation components 408A and 408B can generate the robot parameters. For example, the simulation components 408A and 408B can identify a plurality of fields (e.g., pose, orientation, foot placement location, leg placement location, foot placement timing, leg placement timing, gross body motion, joint configuration, distance from a training object, rotation with respect to the training object, etc.) of the simulated robot for defining the robot parameters. The simulation components 408A and 408B can define the robot parameters based on one or more field values for all or a portion of the plurality of fields (e.g., a particular pose, a particular orientation, etc.) In some cases, the simulation components 408A and 408B can identify sensor data associated with the robot and generate the robot parameters for the simulated robot based on the identified sensor data.

Further, the simulation components 408A and 408B can obtain one or more climbing operations 412A and 412B. In some embodiments, the simulation components 408A and 408B can define one or more climbing operations. In some embodiments, the simulation components 408A and 408B can generate the one or more climbing operations 412A and 412B based on one or more climbing operation parameters. For example, the one or more climbing operation parameters may include one or more of a pose, an orientation, a foot placement location, a leg placement location, a foot placement timing, a leg placement timing, a gross body motion, a leg movement, a foot movement, a body movement, etc. The simulation components 408A and 408B can generate the one or more climbing operations 412A and 412B based on a series of climbing operation parameters (e.g., a series of foot placement locations associated with a series of foot placement timings and a series of foot movements).

To identify a climbing operation to associate with a particular combination of a robot parameter(s) and a training object having a particular characteristic(s), the simulation components 408A and 408B can perform reinforcement learning using a machine learning model. The task or goal for the reinforcement learning may be climbing of a particular training object by the simulated robot to achieve placement of the simulated robot on the training object without the simulated robot tripping, falling, contacting the training object or another object in an unintended manner (e.g., contacting another object with the body of the simulated robot), etc. The simulation components 408A and 408B may provide a reward or penalty to the machine learning model based on determining whether the climbing operation results in placement of the simulated robot on the training object, particular contact of the simulated robot with the training object or another object, tripping or falling of the simulated robot, etc. Therefore, the simulation components 408A and 408B may utilize reinforcement learning to identify a particular climbing operation to achieve placement of the simulated robot on a particular training object.

The simulation components 408A and 408B can be trained by simulating climbing of all or a portion of the training objects 410A and 410B using the one or more climbing operations 412A and 412B, the robot parameter(s), and the characteristic(s) of the training objects 410A and 410B. The simulation components 408A and 408B can simultaneously simulate performance of all or a portion of the climbing operations 412A and 412B by the simulated robot for all or a portion of the training objects 410A and 410B. The simulation components 408A and 408B can utilize the simulated climbing of all or a portion of the training objects 410A and 410B to determine one or more policies linking the particular training objects 410A and 410B, the robot parameters, and the characteristic to one or more climbing operations.

Based on simulating the climbing of all or a portion of the training objects 410A and 410B, the simulation components 408A and 408B can identify one or more of the climbing operations 412A and 412B that result in the simulated robot (having a particular robot parameter(s)) successfully climbing a particular training object (e.g., such that the simulated robot is able to place all or a portion of the feet of the robot on a top of the training object without falling, tripping, etc.). The simulation components 408A and 408B can associate one or more of the climbing operations 412A and 412B with the particular training object for a robot having the particular robot parameter(s) based on determining that the one or more of the climbing operations 412A and 412B result in a successful climbing of the particular object by the simulated robot having the particular robot parameter(s).

In some cases, the simulation components 408A and 408B may generate association data (e.g., one or more policies linking a particular climbing operation to a particular training object and a particular robot parameter) that associates a respective one or more of the climbing operations 412A and 412B to a respective training object having a particular characteristic and the particular robot parameter(s) based on the simulation performed by the simulation components 408A and 408B.

The simulation components 408A and 408B may periodically or aperiodically update the association data. For example, the simulation components 408A and 408B may update the association data based on identification of updated robot parameters, updated training objects 410A and 410B, and/or updated climbing operations 412A and 412B. In some cases, the simulation components 408A and 408B may continuously update the association data.

In some cases, the simulation component 408B may generate the association data and may deploy the association data to the robot 100 (e.g., the control system 170 of the robot 100). The simulation component 408B may periodically or aperiodically deploy the association data and/or updates to the association data to the robot 100.

The simulation components 408A and 408B can provide the association data (e.g., the policies) and the training objects 410A and 410B to the control system 170 of the robot 100. The control system 170 may store the association data for identification of a climbing operation(s) for an object(s). In response to identifying an object, the control system 170 can access the association data.

The control system 170 may obtain, in real time, sensor data (e.g., from one or more sensors of the robot 100) based on traversal of an environment of the robot 100. Based on the sensor data, the control system 170 may identify one or more robot parameters of the robot 100, an object in the environment, and a characteristic of the object (e.g., a height and/or height range of the object, a width and/or width range of the object, a depth and/or depth range of the object, a classification of the object, etc.). The object in the environment may include a section of the environment with a particular characteristic (e.g., a particular terrain, height, topography, contour, profile, shape, etc.). For example, the object may be a box, a platform, a vehicle, a ledge, a table, a desk, a chair, etc.

In some cases, the control system 170 may utilize the sensor data to generate the characteristic of the object. For example, the control system 170 may identify a point cloud associated with the object and may identify a height, a width, a depth, etc. of the object. Further, the control system 170 may classify the object based on the sensor data. For example, the control system 170 may implement a classification module to classify the object into one or more classes (e.g., a vehicle, a box, a platform, a wall, a person, etc.) based on the sensor data.

In some embodiments, the control system 170 may determine the characteristic of the object based on the sensor data. For example, the environment may include a fiducial marker identifying the characteristic of the object. The robot 100 may scan the fiducial marker and produce sensor data based on scanning the fiducial marker. The control system 170 may utilize the sensor data to identify the characteristic of the object identified by the fiducial marker.

The control system 170 may compare the object to the training objects 410A and 410B to identify one or more of the training objects 410A and 410B that match or are within a particular range of the object. In some embodiments, the control system 170 may compare the object to the training objects using the association data. For example, the control system 170 may compare the characteristic of the object to a respective characteristic of all or a portion of the training objects 410A and 410B identified by the association data.

The control system 170 may identify one or more of the training objects 410A and 410B that has a characteristic that matches the characteristic of the object or is within a particular range of similarity of the characteristic of the object (e.g., within 4 inches of the height of the object, within 90% of the height of the object, etc.). For example, the characteristic of the object may reflect that the object represents a vehicle and the control system 170 may identify a training object with a characteristic identifying that the training object represents a vehicle.

Based on comparing the object to the training objects 410A and 410B and identifying the one or more of the training objects 410A and 410B that match or are within the particular range of the object, the control system 170 identify one or more of the climbing operations 412A and 412B that is associated with the one or more of the training objects 410A and 410B and associated with the one or more robot parameters of the robot 100.

The control system 170 may instruct the robot 100, in real time, to implement the one or more of the climbing operations 412A and 412B to climb the object. For example, the control system 170 may cause movement of one or more legs of the robot 100 and/or the body of the robot in accordance with the one or more of the climbing operations 412A and 412B. The control system 170 may provide the one or more of the climbing operations 412A and 412B to the maneuver controller 200 and the maneuver controller 200 may produce one or more actuator commands for one or more actuators of the robot 100. Further, the maneuver controller 200 may instruct actuation of the one or more actuators according to the one or more actuator commands.

To better illustrate execution of a representative climbing operation by the robot, FIGS. 5A-5G illustrate an example robot 502 relative to an object 506 and executing a climbing operation across a time period according to certain examples of the disclosed technologies. The robot 502 may be or may include the robot 100 as described in FIG. 1A and FIG. 1B.

FIGS. 5A-5G show the progression of a robot 502 as the climbing operation is performed. The climbing operation may include or may indicate multiple sub-operations or movements (e.g., a series of iterative movements). For example, each of the FIGS. 5A-5G may correspond to a particular sub-operation of the climbing operation. In some cases, the climbing operation may include or may indicate a respective series of iterative movements for all or a portion of the legs of the robot 502. It will be understood that in some embodiments, more, less, or different sub-operations may be performed as part of performing the climbing operation. For example, in some cases, a first sub-operation as identified in FIG. 5B may not be performed. In another example, the climbing operation may include sub-operations associated with a different sequence of contacts by the robot with the object and/or the surface. Further, the climbing operation may include sub-operations that cause the robot to move in a plane other than the sagittal plane (e.g., the coronal plane, the transverse plane, etc.).

Figure 5A:
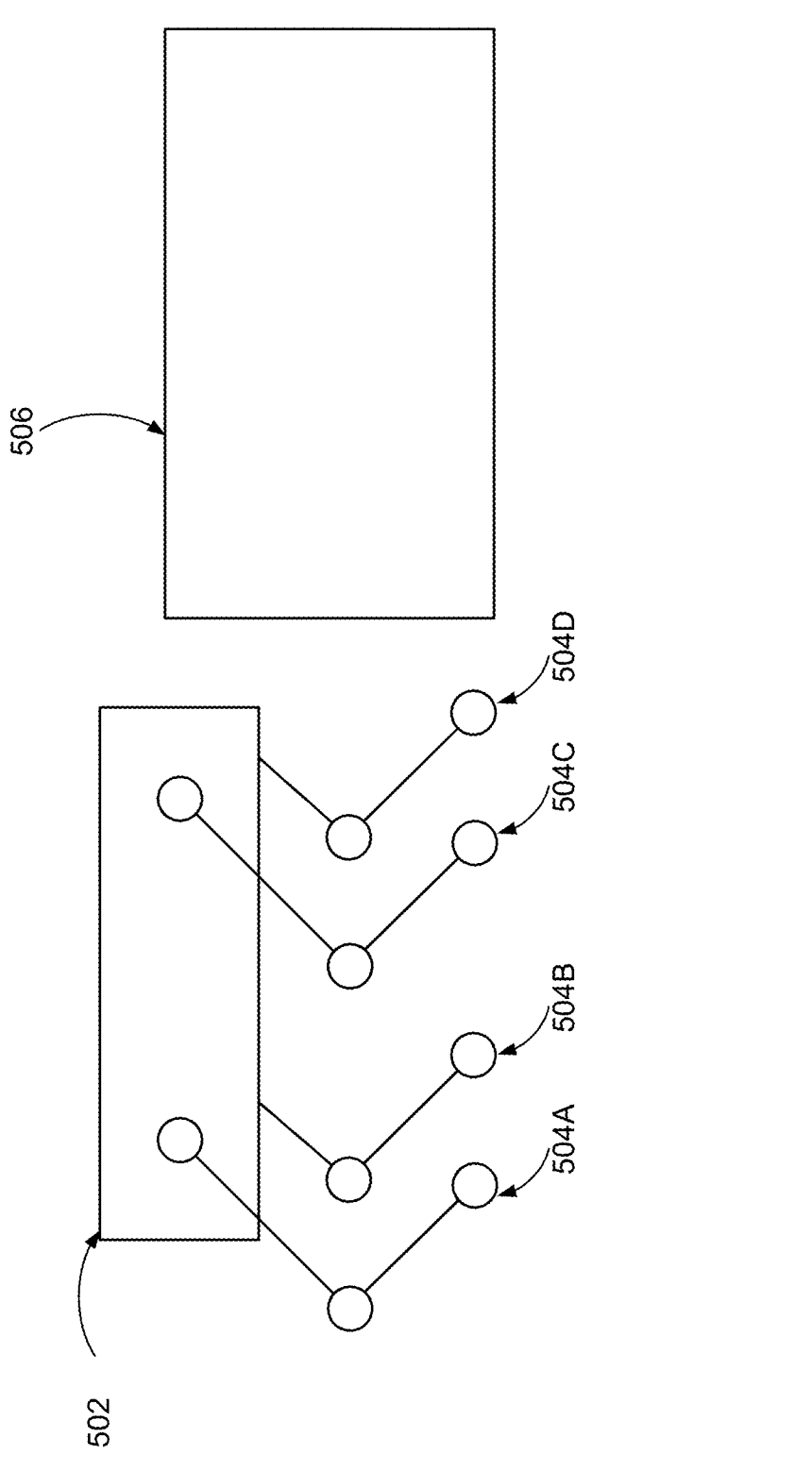
FIG. 5A is a schematic view of a robot in an environment with a climbable object.

FIG. 5A shows a schematic view 500A of a robot 502 relative to an object 506. The robot 502 may be oriented relative to the object 506 such that a front portion of the robot 502 faces the object 506. The robot 502 may be a legged robot. In the example of FIG. 5A, the robot 502 is a legged robot that includes four legs: a first leg (e.g., a right rear leg), a second leg (e.g., a left rear leg), a third leg (e.g., a right front leg), and a fourth leg (e.g., a left front leg). The object 506 may be a box, a platform, all or a portion of a vehicle, a desk, a table, a ledge, etc.

The robot 502 may be associated with one or more robot parameters (e.g., a distance from the robot 502 to the object 506) and the object 506 may be associated with one or more characteristics. A simulation system may utilize the one or more robot parameters and/or the one or more characteristics to identify the climbing operation for the robot 502 as discussed above.

The schematic view 500A may reflect a first (e.g., an initial) state of the robot 502 prior to implementation of the climbing operation. For example, an initial state of the robot 502 that is used to determine the one or more robot parameters. In some cases, the schematic view may reflect an initial state of the robot 502 that the robot 502 is maneuvered into for implementation of the climbing operation.

The one or more robot parameters may include one or more robot parameters of the four legs (e.g., a position relative to the surface, a position in a three-dimensional space, an amount of flexion, extension, rotation, turning, etc.). Each of the four legs may have a first robot parameter (e.g., a position identifying an amount of flexion, extension, rotation, turning, etc.) and may have a distal end that has a first robot parameter (e.g., a position relative to a surface). In the example of FIG. 5A, a distal end of the first leg has a first robot parameter (e.g., a first position) 504A, the distal end of the second leg has a first robot parameter 504B, the distal end of the third leg has a first robot parameter 504C, and the distal end of the fourth leg has a first robot parameter 504D.

Figure 5B:
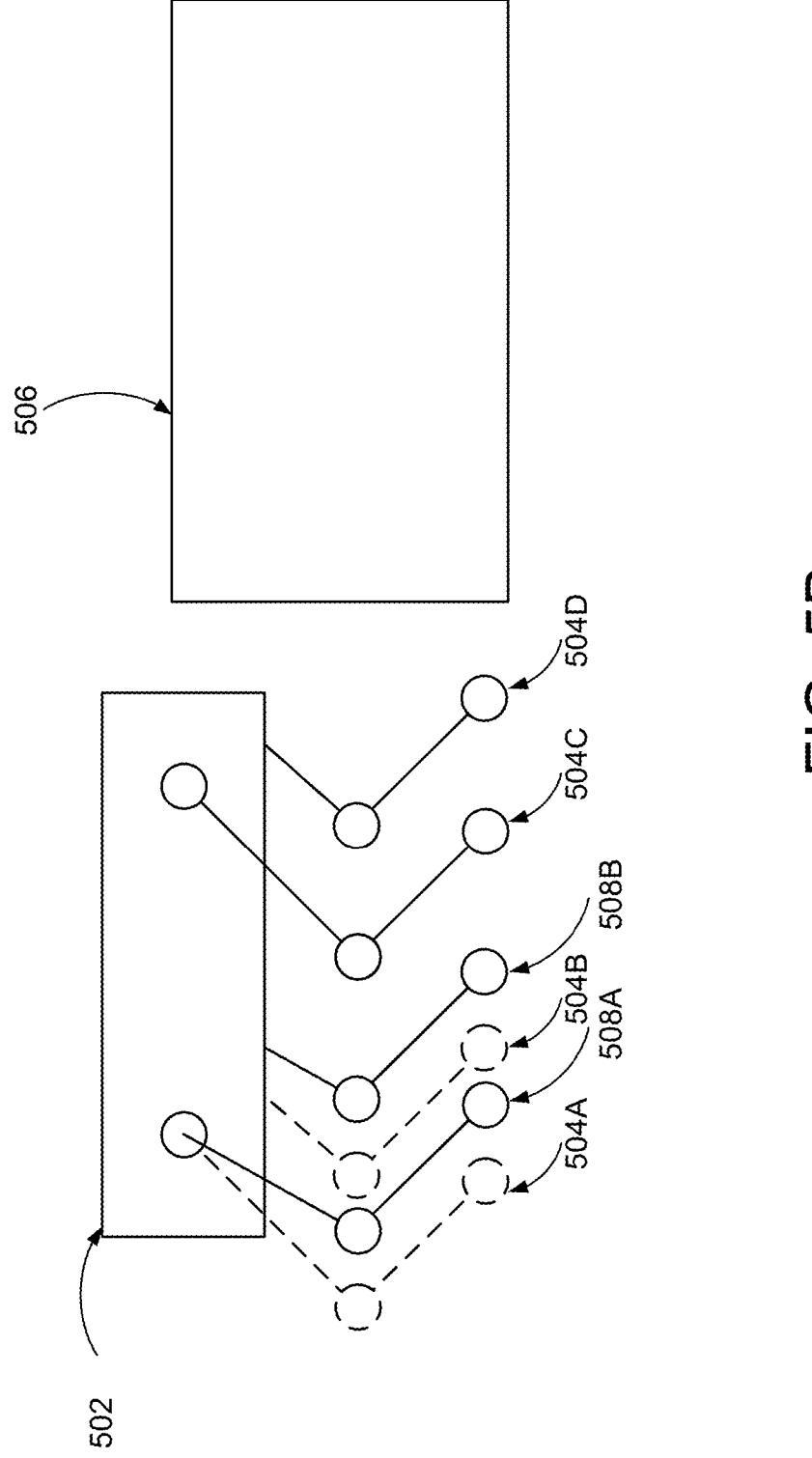
FIG. 5B is a schematic view of a robot in an environment with a climbable object.

FIG. 5B shows a schematic view 500B of the robot 502 relative to the object 506. The schematic view 500B may identify a second state of the robot 502 after implementation of a first sub-operation of the climbing operation. Further, the schematic view 500B may identify a second state of the robot 502 based on performance of the first sub-operation (e.g., causing movement of the robot 502 from the first state of the robot 502 identified by FIG. 5A to the second state).

The first sub-operation may include a movement of the first leg and the second leg of the robot 502 and/or a movement of a distal end of the first leg and the second leg. For example, performance of the first sub-operation may cause the distal end of the first leg and the distal end of the second leg and/or the first leg and the second leg to simultaneously or iteratively move to updated positions. In some cases, the robot 502 may perform the first sub-operation such that the distal end of the first leg and the distal end of the second leg simultaneously transition to updated positions (e.g., in a hopping movement). In some cases, the robot 502 may perform the first sub-operation such that each of the distal end of the first leg and the distal end of the second leg iteratively transition to the updated positions.

The first sub-operation may include a movement of the distal end of the third leg and the distal end of the fourth leg of the robot 502. In some cases, the first sub-operation may not include a movement of the distal end of the third leg and/or the distal end of the fourth leg and the distal end of the third leg and/or the distal end of the fourth leg may maintain a particular position.

Based on performance of the first sub-operation, all or a portion of the four legs and/or the distal ends of the four legs may have a second robot parameter. In the example of FIG. 5B, the distal end of the first leg has a second robot parameter (e.g., a second position) 508A and the distal end of the second leg has a second robot parameter 508B. Further, the distal end of the third leg maintains the first robot parameter 504C and the distal end of the fourth leg maintains the first robot parameter 504D.

Figure 5C:
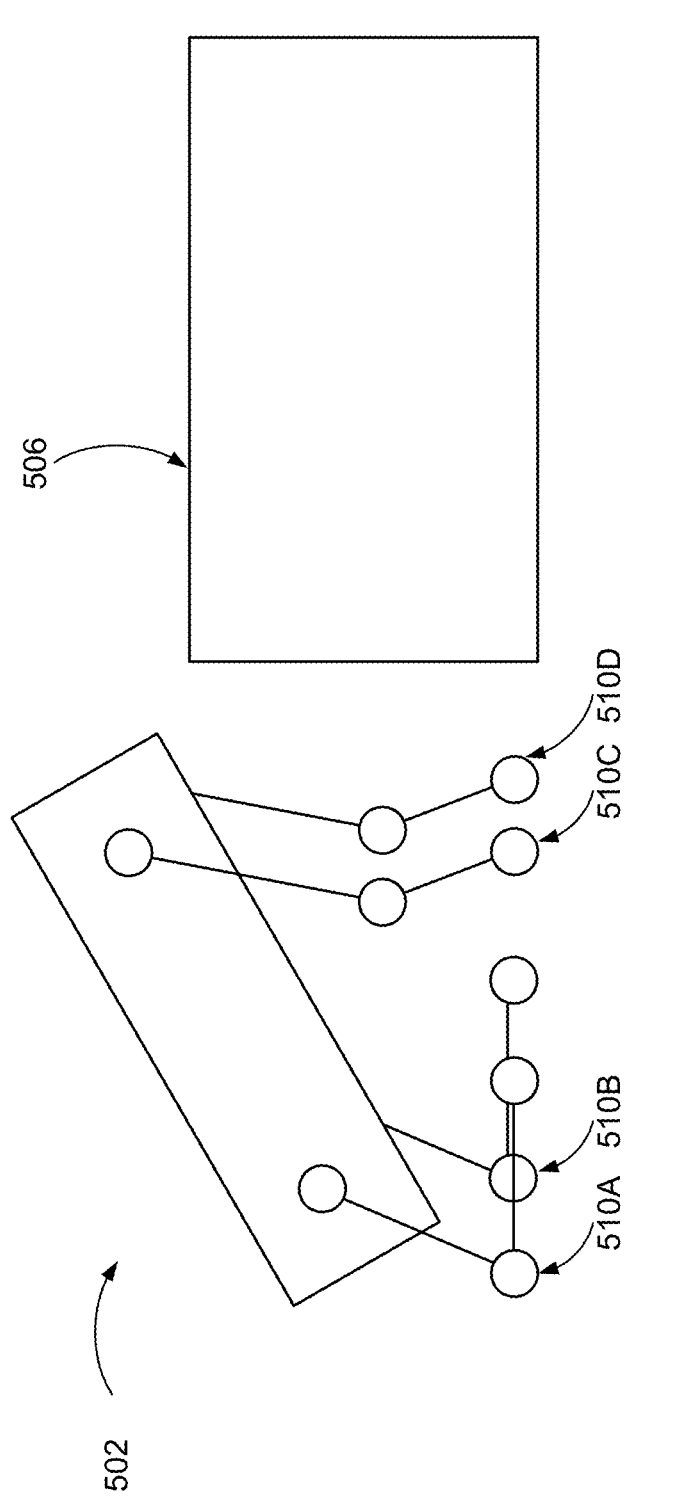
FIG. 5C is a schematic view of a robot in an environment with a climbable object.

FIG. 5C shows a schematic view 500C of the robot 502 relative to the object 506. The schematic view 500C may identify a third state of the robot 502 after implementation of a second sub-operation of the climbing operation. Further, the schematic view 500C may identify a third state of the robot 502 based on performance of the second sub-operation (e.g., causing movement of the robot 502 from the second state of the robot 502 identified by FIG. 5B to the third state).

The second sub-operation may include a movement of the first leg, the second leg, the third leg, and the fourth leg and a movement of the distal end of the first leg, the distal end of the second leg, the distal end of the third leg, and the distal end of the fourth leg of the robot 502. For example, performance of the second sub-operation may cause one or more of the first leg, the second leg, the third leg, or the fourth leg and/or one or more of a distal end of the first leg, the second leg, the third leg, or the fourth leg to simultaneously or iteratively move to updated positions. The second sub-operation may include one or more of a flexion of the first leg and/or the second leg and an extension of the third leg and/or the fourth leg. Performance of the second sub-operation may cause the front portion of the robot 502 to be shifted upwards and a rear portion of the robot 502 to be shifted downwards.

In some cases, the second sub-operation may include a shift of the weight distribution of the robot 502. For example, performance of the second sub-operation may cause the weight distribution to shift to a rear portion of the robot 502 (e.g., a rear portion of the robot 502 relative to the object 506).

Based on performance of the second sub-operation, all or a portion of the four legs and/or the distal ends of the four legs may have a third robot parameter. In the example of FIG. 5C, the first leg has a third robot parameter (e.g., a third position) 510A, the second leg has a third robot parameter 510B, the third leg has a third robot parameter 510C, and the fourth leg has a third robot parameter 510D. In some embodiments, one or more of the four legs and/or a distal end of one or more of the four legs may maintain a prior robot parameter.

Figure 5D:
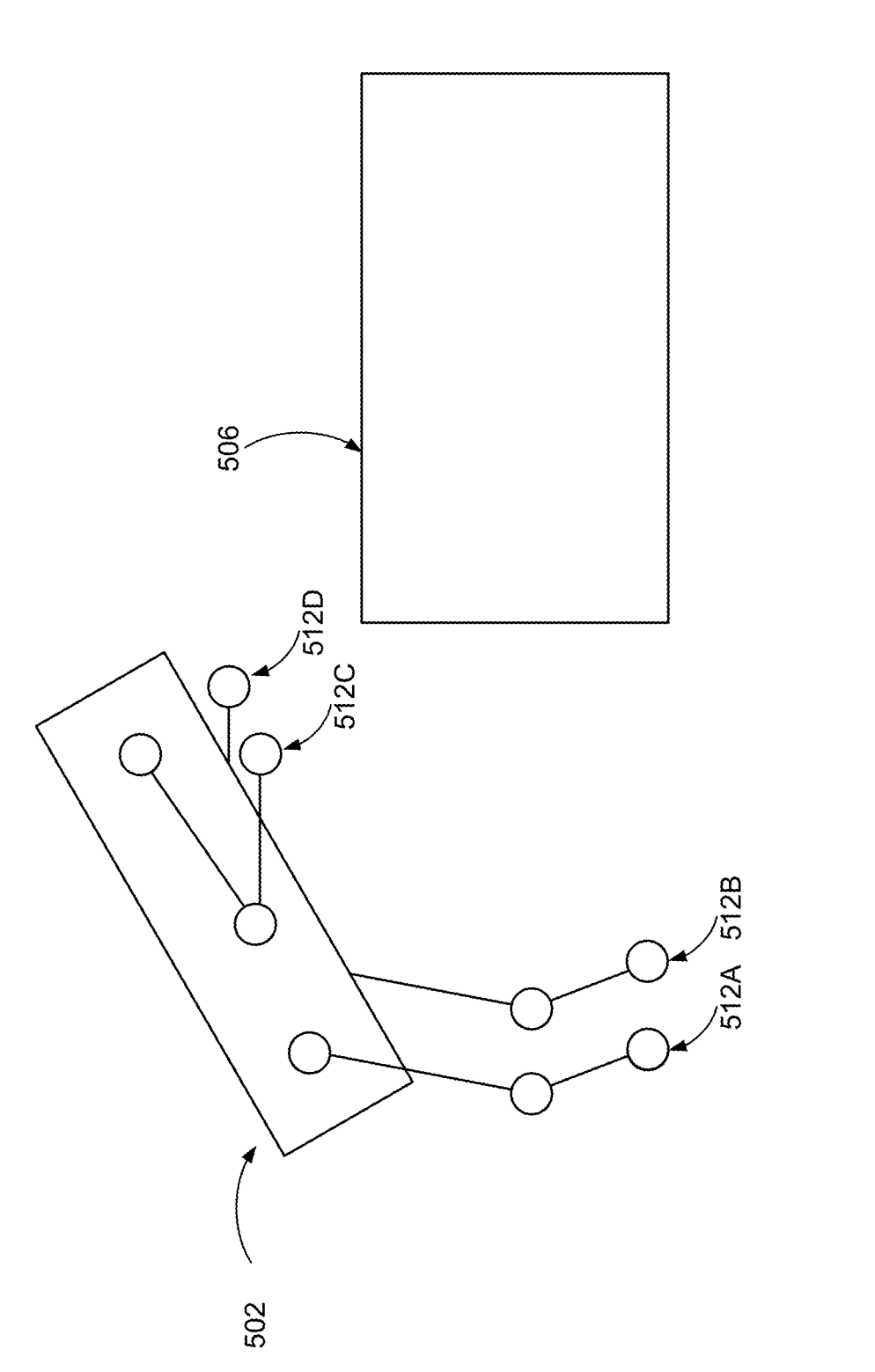
FIG. 5D is a schematic view of a robot in an environment with a climbable object.

FIG. 5D shows a schematic view 500D of the robot 502 relative to the object 506. The schematic view 500D may identify a fourth state of the robot 502 after implementation of a third sub-operation of the climbing operation. Further, the schematic view 500D may identify a fourth state of the robot 502 based on performance of the third sub-operation (e.g., causing movement of the robot 502 from the third state of the robot 502 identified by FIG. 5C to the fourth state).

The third sub-operation may include a movement of the first leg, the second leg, the third leg, and the fourth leg and a movement of the distal end of the first leg, the distal end of the second leg, the distal end of the third leg, and the distal end of the fourth leg of the robot 502. For example, performance of the third sub-operation may cause one or more of the first leg, the second leg, the third leg, or the fourth leg and/or one or more of a distal end of the first leg, the second leg, the third leg, or the fourth leg to simultaneously or iteratively move to updated positions. The third sub-operation may include one or more of an extension of the first leg and/or the second leg and a flexion of the third leg and/or the fourth leg. Performance of the third sub-operation may further include providing a force to a surface using the first leg and/or the second leg (e.g., the distal end of the first leg and/or the distal end of the second leg). Performance of the third sub-operation may cause the height of the body of the robot 502 relative to the surface (e.g., the ground) to increase as compared to the third state.

In some cases, performance of the third sub-operation may cause the first leg and/or the second leg (e.g., the distal end of the first leg and/or the distal end of the second leg) to maintain contact with the surface and may cause the third leg and/or the fourth leg (e.g., the distal end of the third leg and/or the distal end of the fourth leg) to not be in contact with the surface. Further, performance of the third sub-operation may cause the robot 502 to dynamically balance on the first leg and/or the second leg (e.g., the distal end of the first leg and/or the distal end of the second leg).

Based on performance of the third sub-operation, all or a portion of the four legs and/or the distal ends of the four legs may have a fourth robot parameter. In the example of FIG. 5D, the distal end of the first leg has a fourth robot parameter (e.g., a fourth position) 512A, the distal end of the second leg has a fourth robot parameter 512B, the distal end of the third leg has a fourth robot parameter 512C, and the distal end of the fourth leg has a fourth robot parameter 512D. In some embodiments, one or more of the four legs and/or a distal end of one or more of the four legs may maintain a prior robot parameter.

Figure 5E:
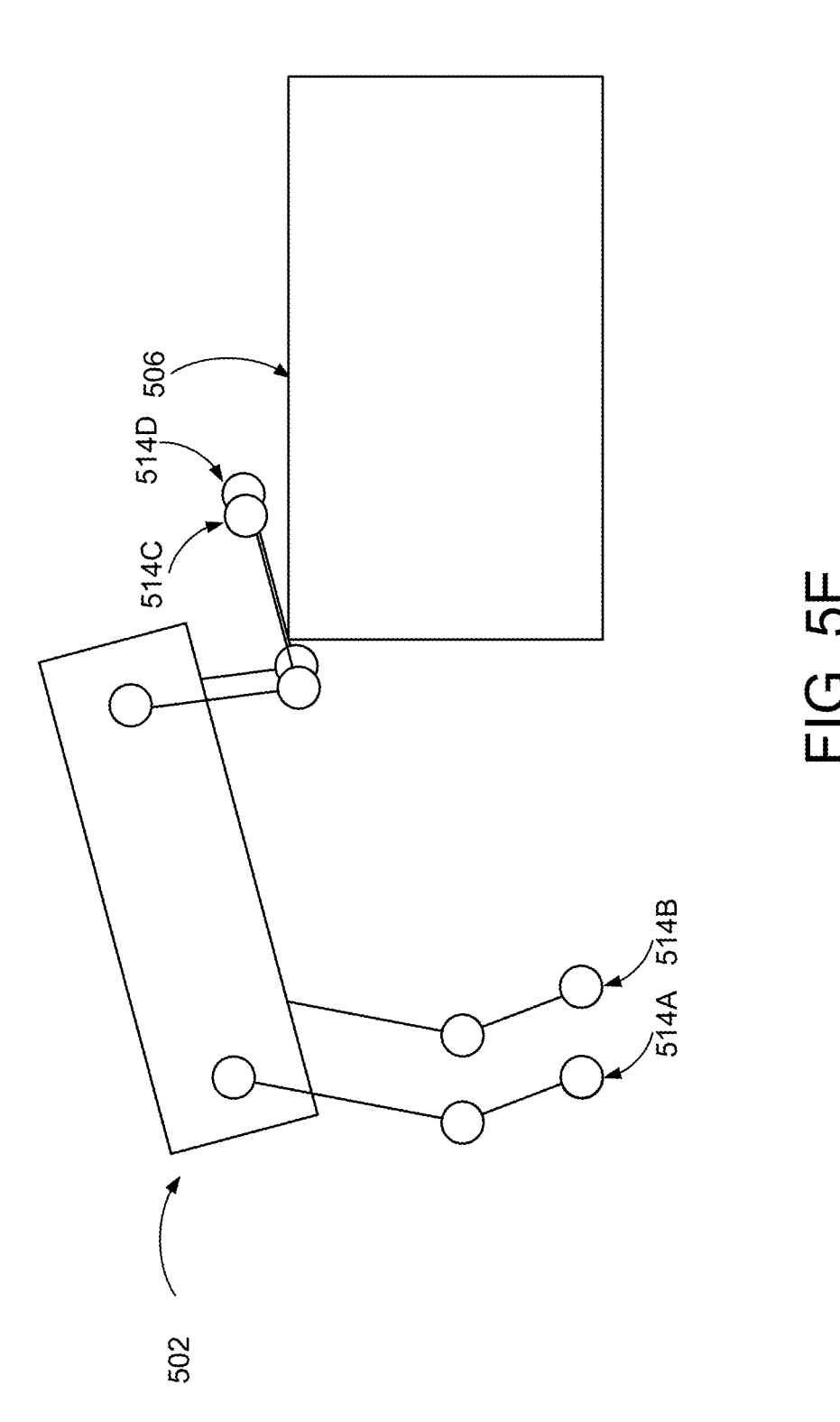
FIG. 5E is a schematic view of a robot in an environment with a climbable object.

FIG. 5E shows a schematic view 500E of the robot 502 relative to the object 506. The schematic view 500E may identify a fifth state of the robot 502 after implementation of a fourth sub-operation of the climbing operation. Further, the schematic view 500E may identify a fifth state of the robot 502 based on performance of the fourth sub-operation (e.g., causing movement of the robot 502 from the fourth state of the robot 502 identified by FIG. 5D to the fifth state).

The fourth sub-operation a movement of the first leg, the second leg, the third leg, and the fourth leg and a movement of the distal end of the first leg, the distal end of the second leg, the distal end of the third leg, and the distal end of the fourth leg of the robot 502. For example, performance of the fourth sub-operation may cause one or more of the first leg, the second leg, the third leg, or the fourth leg and/or one or more of a distal end of the first leg, the second leg, the third leg, or the fourth leg to simultaneously or iteratively move to updated positions. The fourth sub-operation may include an extension of the third leg and/or the fourth leg. In some cases, the fourth sub-operation may include an extension and/or flexion of the first leg and/or the second leg.

In some cases, the fourth sub-operation may include a shift of the weight distribution of the robot 502. For example, performance of the fourth sub-operation may cause the weight distribution of the robot 502 to shift to a front portion of the robot 502 (e.g., a front portion of the robot 502 relative to the object 506) such that a height of the front portion of the robot 502 relative to the surface and/or the object 506 decreases as compared to the fourth state of the robot 502.

Based on performance of the second sub-operation, all or a portion of the four legs and/or the distal ends of the four legs may have a fifth robot parameter. In the example of FIG. 5E, the distal end of the first leg has a fifth robot parameter (e.g., a fifth position) 514A, the distal end of the second leg has a fifth robot parameter 514B, the distal end of the third leg has a fifth robot parameter 514C, and the distal end of the fourth leg has a fifth robot parameter 514D. In some embodiments, one or more of the four legs and/or a distal end of one or more of the four legs may maintain a prior robot parameter.

Figure 5F:
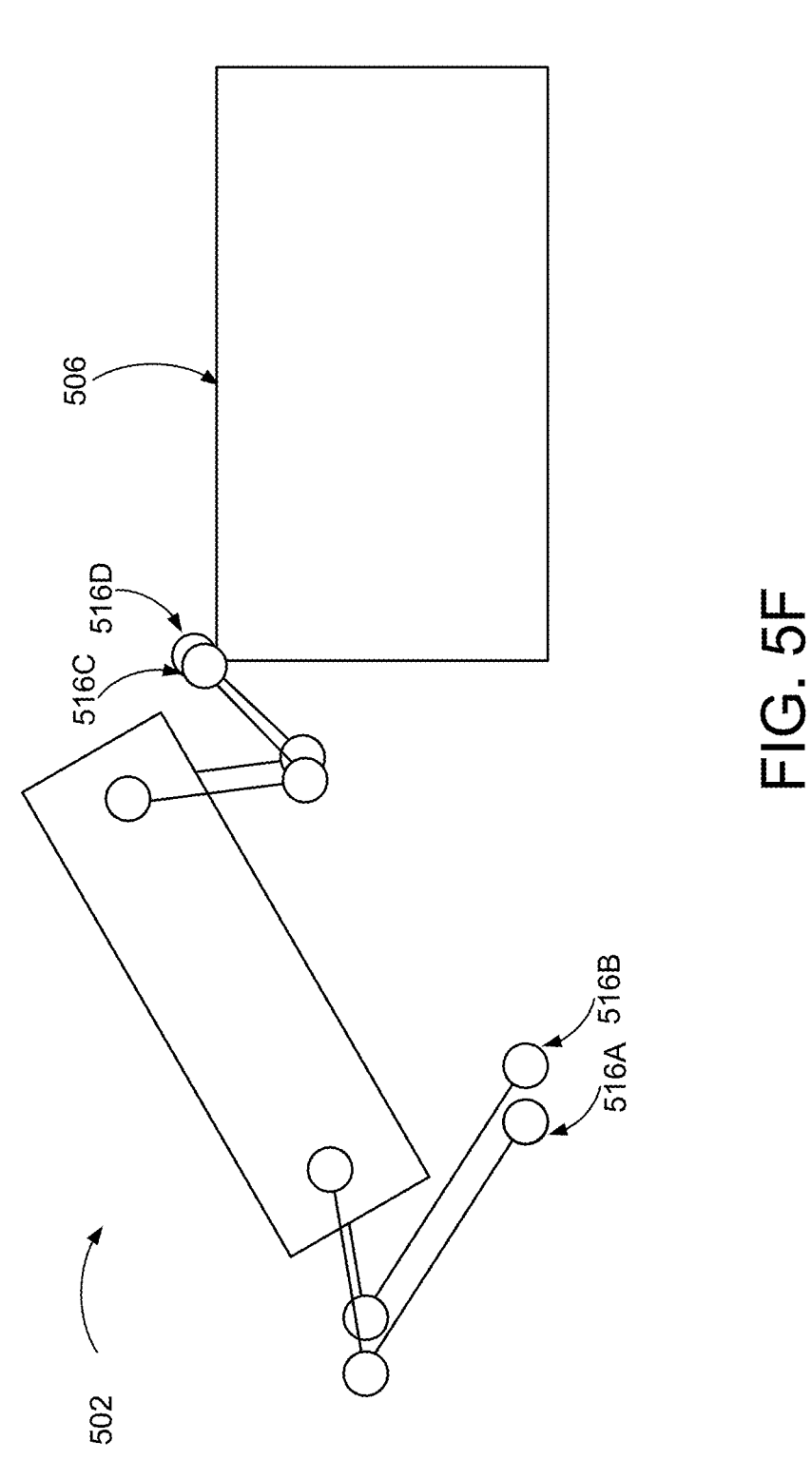
FIG. 5F is a schematic view of a robot in an environment with a climbable object.

FIG. 5F shows a schematic view 500F of the robot 502 relative to the object 506. The schematic view 500F may identify a sixth state of the robot 502 after implementation of a fifth sub-operation of the climbing operation. Further, the schematic view 500F may identify a sixth state of the robot 502 based on performance of the fifth sub-operation (e.g., causing movement of the robot 502 from the fifth state of the robot 502 identified by FIG. 5E to the sixth state).

The fifth sub-operation a movement of the first leg, the second leg, the third leg, and the fourth leg and a movement of the distal end of the first leg, the distal end of the second leg, the distal end of the third leg, and the distal end of the fourth leg of the robot 502. For example, performance of the fifth sub-operation may cause one or more of the first leg, the second leg, the third leg, or the fourth leg and/or one or more of a distal end of the first leg, the second leg, the third leg, or the fourth leg to simultaneously or iteratively move to updated positions. The fifth sub-operation may cause the first leg and/or the second leg to shift rearwardly (e.g., a pivot point or knee joint of the first leg and/or the second leg to shift rearwardly). Further, the fifth sub-operation may include a flexion of the first leg and/or the second leg. In some cases, the fourth sub-operation may include a flexion of the third leg and/or the fourth leg. Further, the fourth sub-operation may include sliding a distal end of the third leg and/or the fourth leg such that the distal end of the third leg and/or the fourth leg contacts an edge of the object 506.

Based on performance of the fifth sub-operation, all or a portion of the four legs and/or the distal ends of the four legs may have a sixth robot parameter. In the example of FIG. 5F, the distal end of the first leg has a sixth robot parameter (e.g., a sixth position) 516A, the distal end of the second leg has a sixth robot parameter 516B, the distal end of the third leg has a sixth robot parameter 516C, and the distal end of the fourth leg has a sixth robot parameter 516D. In some embodiments, one or more of the four legs and/or a distal end of one or more of the four legs may maintain a prior robot parameter.

Figure 5G:
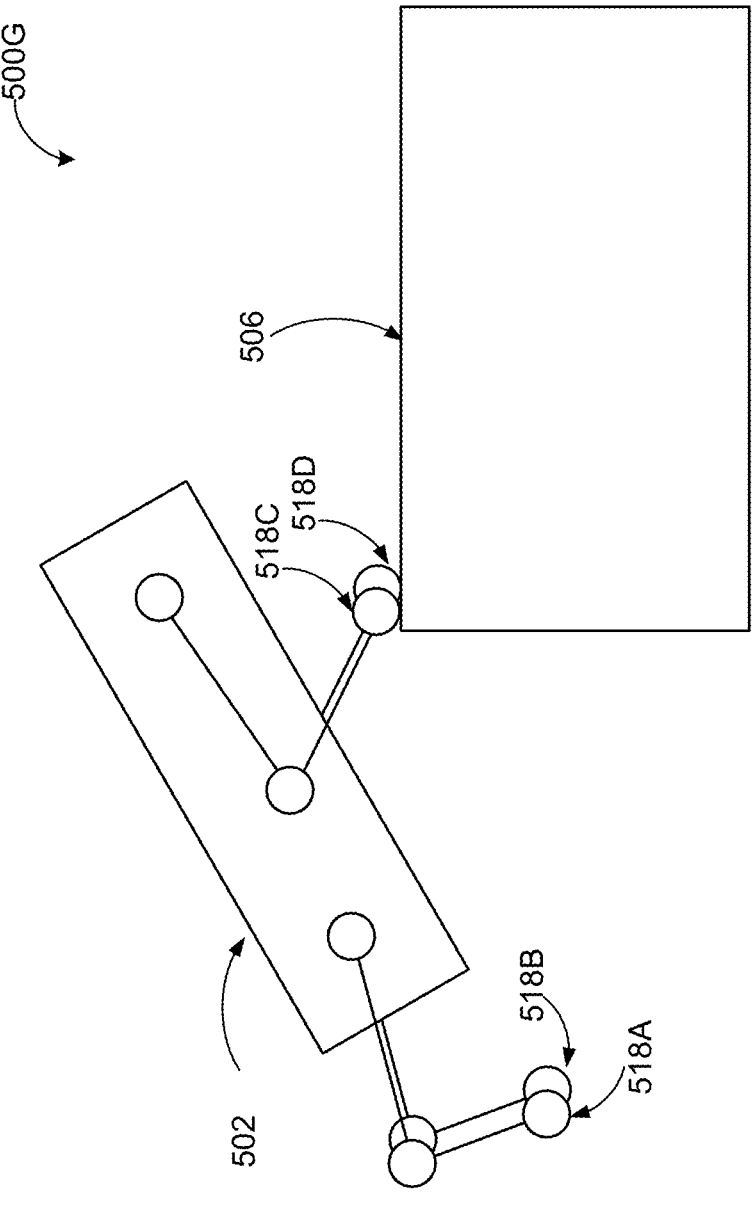
FIG. 5G is a schematic view of a robot in an environment with a climbable object.

FIG. 5G shows a schematic view 500G of the robot 502 relative to the object 506. The schematic view 500G may identify a seventh state of the robot 502 after implementation of a sixth sub-operation of the climbing operation. Further, the schematic view 500G may identify a seventh state of the robot 502 based on performance of the sixth sub-operation (e.g., causing movement of the robot 502 from the sixth state of the robot 502 identified by FIG. 5F to the seventh state).

The sixth sub-operation a movement of the first leg, the second leg, the third leg, and the fourth leg and a movement of the distal end of the first leg, the distal end of the second leg, the distal end of the third leg, and the distal end of the fourth leg of the robot 502. For example, performance of the sixth sub-operation may cause one or more of the first leg, the second leg, the third leg, or the fourth leg and/or one or more of a distal end of the first leg, the second leg, the third leg, or the fourth leg to simultaneously or iteratively move to updated positions. The sixth sub-operation may include one or more of an extension of the third leg and/or the fourth leg and a flexion of the first leg and/or the second leg. Performance of the sixth sub-operation may further include providing a force to a surface of the object 506 using the third leg and/or the fourth leg. Performance of the sixth sub-operation may cause the height of the body of the robot 502 relative to the ground to increase as compared to the sixth state.

In some cases, performance of the sixth sub-operation may cause the third leg and/or the fourth leg (e.g., the distal end of the third leg and/or the fourth leg) to maintain contact with a surface of the object 506 and may cause the first leg and/or the second leg (e.g., the distal end of the first leg and/or the second leg) to not be in contact with the surface (e.g., the ground). Further, performance of the sixth sub-operation may cause the robot 502 to dynamically balance on the third leg and/or the fourth leg (e.g., the distal end of the third leg and/or the fourth leg).

Based on performance of the sixth sub-operation, all or a portion of the four legs and/or the distal ends of the four legs may have a seventh robot parameter. In the example of FIG. 5G, the distal end of the first leg has a seventh robot parameter (e.g., a seventh position) 518A, the distal end of the second leg has a seventh robot parameter 518B, the distal end of the third leg has a seventh robot parameter 518C, and the distal end of the fourth leg has a seventh robot parameter 518D. In some embodiments, one or more of the four legs and/or a distal end of one or more of the four legs may maintain a prior robot parameter.

Based on performance of the sixth operation, the robot 502 may operate one or more of the first leg, the second leg, the third leg, and/or the fourth leg to position the robot 502 on the object 506. As performance of the operations may cause the distal end of the first leg, the distal end of the second leg, the distal end of the third leg, and/or the distal end of the fourth leg to be positioned level with or above the surface of the object 506, the robot 502 is able to position on the object 506.

Figure 5H:
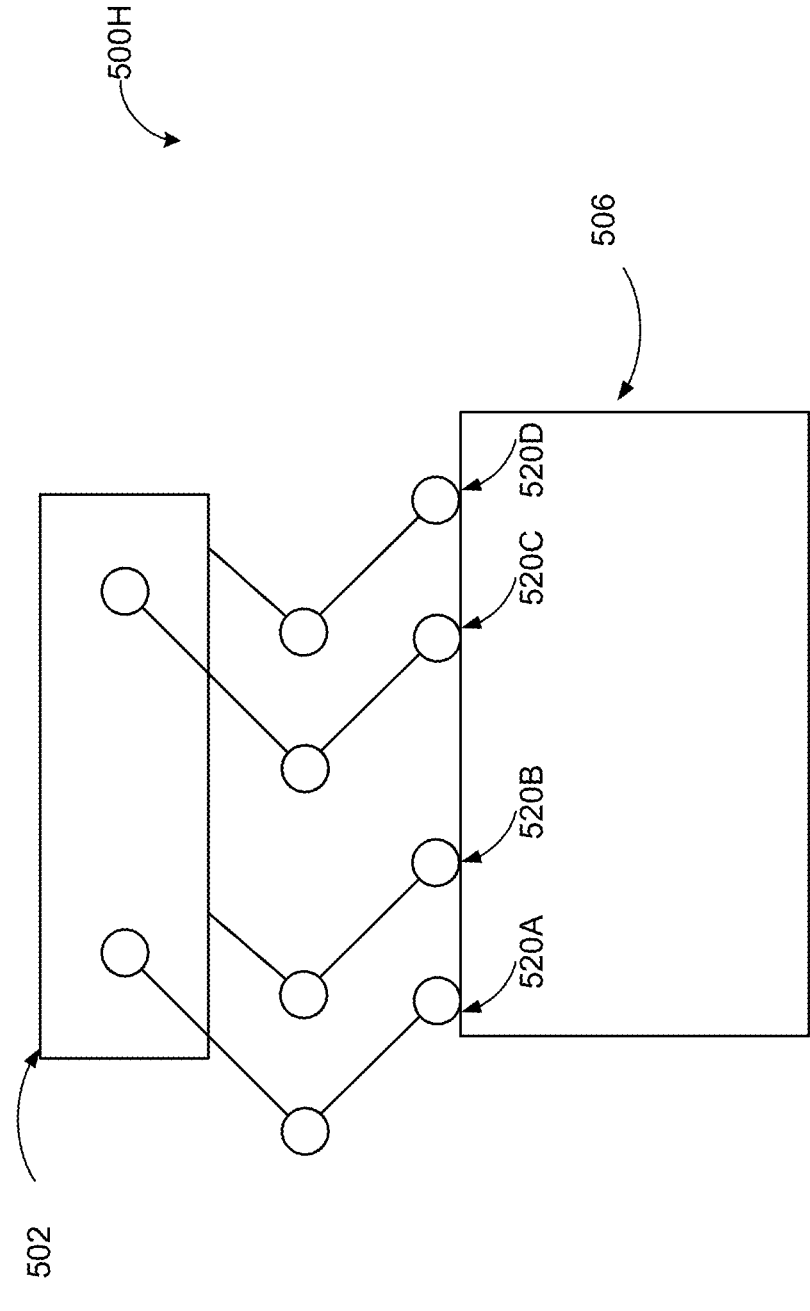
FIG. 5H is a schematic view of a robot in an environment with a climbable object.

FIG. 5H shows a schematic view 500H of the robot 502 relative to the object 506. The schematic view 500H may reflect an eighth (e.g., a final) state of the robot 502 subsequent to implementation of the climbing operation.

Each of the four legs and/or the distal ends of the four legs may have an eighth robot parameter (e.g., position relative to the surface, position in a three-dimensional space, an amount of flexion, extension, rotation, turning, etc.). In the example of FIG. 5H, the distal end of the first leg has an eighth robot parameter (e.g., an eighth position) 520A, the distal end of the second leg has an eighth robot parameter 520B, the distal end of the third leg has an eighth robot parameter 520C, and the distal end of the fourth leg has an eighth robot parameter 520D. In some embodiments, one or more of the four legs and/or a distal end of one or more of the four legs may maintain a prior robot parameter.

Figure 6:
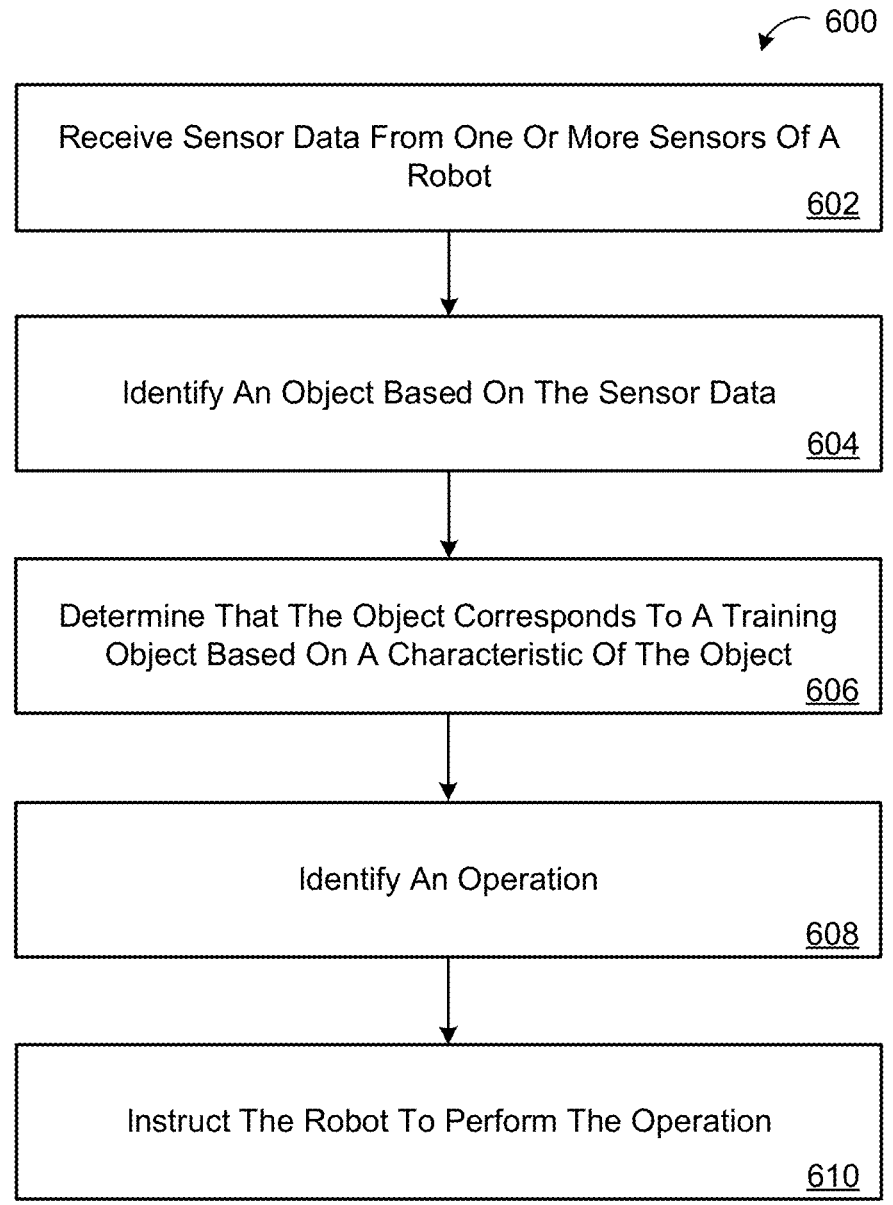
FIG. 6 is a flowchart of an example arrangement of operations for identifying a climbing operation and instructing a robot to perform the climbing operation.

FIG. 6 shows a method 600 executed by a computing system that identifies an operation and instructs a robot (e.g., a four-legged robot) to perform the operation, according to some examples of the disclosed technologies. The computing system may be similar, for example, to and/or may include the simulation system 406A, the sensor system 130, the control system 170, the computing system 140, the computing system 402, and/or the simulation system 406B as discussed above, and may include memory and/or data processing hardware. For example, the computing system may be located on and/or externally to the robot.

At block 602, the computing system receives sensor data from one or more sensors of a robot. The sensor data may be sensor data of an environment of the robot. The one or more sensors may include one or more of a camera (e.g., a stereo camera), a LIDAR sensor, a LADAR sensor, an odometry sensor, a gyroscope, an inertial measurement unit sensor, an accelerometer, a magnetometer, a position sensor, a height sensor, etc. The sensor data may include one or more of odometry data, point cloud data, fiducial data, orientation data, position data, height data (e.g., a ground plane estimate), time data, an identifier (e.g., a serial number of the robot, a serial number of a sensor, etc.), etc. For example, the height data may be an estimate of a distance between the ground and the body of a robot.

The one or more sensors may capture the sensor data based on movement of the robot along a route through the environment. For example, the one or more sensors may capture the sensor data as the robot traverses the environment.

In some embodiments, the sensor data may be captured by a plurality of sensors from two or more robots. For example, the sensor data may include a first portion (e.g., set) of sensor data captured by one or more first sensors of a first robot (e.g., first sensor data obtained by the first robot) and a second portion (e.g., set) of sensor data captured by one or more second sensors of a second robot (e.g., second sensor data obtained by the second robot). Further, the computing system may merge the first portion of sensor data and the second portion of sensor data to obtain the sensor data.

In some embodiments, the sensor data may include point cloud data. For example, the sensor data may include three-dimensional point cloud data received from a three-dimensional volumetric image sensor.

At block 604, the computing system identifies an object (e.g., an obstacle) based on the sensor data. For example, the computing system may identify an object in the environment of the robot.

In some cases, the computing system may identify an object in a path of the robot. Based on identifying the object in the path of the robot, the computing system may proceed with determining whether the object corresponds to a particular training object. In some embodiments, the computing system may determine and implement an operation for climbing the object based on identifying the object in the path of the robot.

At block 606, the computing system determines that the object corresponds to a training object based on a characteristic of the object. The computing system may analyze a plurality of training objects (e.g., one or more of a vehicle, a trailer, a box, a platform, a rock wall, or a stage) and determine that the object corresponds to a particular training object of the plurality of training objects. All or a portion of the plurality of training objects may be associated with different characteristics. For example, all or a portion of the plurality of training objects may be associated with different classifications (e.g., a classification identifying that the object is or includes a vehicle, a classification identifying that the object is or includes a box, a classification identifying that the object is or includes a human, etc.), different heights (e.g., a height between 30 centimeters and 100 centimeters), etc.

The computing system may determine that the object corresponds to the training object based on comparing the characteristic of the object to a respective characteristic of one or more training objects of the plurality of training objects. Further, the computing system may determine that the object corresponds to the training object based on determining the characteristic of the object matches or is within a particular degree or range of similarity of a characteristic of the training object.

The computing system may introduce noise (e.g., a variation, a modification, etc.) into one or more characteristics such that if a particular characteristic does not represent a real world characteristic of the object (e.g., the characteristic indicates that the object is 4 meters tall and the real world characteristic indicates that the object is 4.5 or 3.5 meters tall), the robot may still successfully execute the operation as the noise added by the robot may account for the variation. For example, the computing system may introduce noise by increasing or decreasing a value of the characteristic (e.g., changing the characteristic from 4 meters to 4.5 meters).

The computing system may identify noise to add to or remove from the characteristic (of the training object or of the real world object) based on the environment, the robot, the object, the user, etc. For example, the computing system may determine the robot is associated with particular noise (e.g., the robot generates and/or obtains sensor data with particular noise, the robot implements operations with particular noise, etc.) and the computing system may add corresponding noise to the characteristic (e.g., the computing system may add 5 centimeters to the height of all or a portion of the training objects) to generate one or more noisy training objects. In another example, the computing system may obtain noisy sensor data that adds 5 centimeters to the real world height of the object such that the robot can remove 5 centimeters from the height as indicated by the noisy sensor data or add 5 centimeters to the characteristics of the training objects.

To maintain a clearance with the object, the computing system may implement operations with 5 centimeters of noise such that the computing system can remove 5 centimeters from the height as indicated by the sensor data or add 5 centimeters to the characteristics of the training objects. For example, for a real world object with a height of 25 centimeters, the computing system may identify a training object with a height of 30 centimeters (by adding 5 centimeters to the 25 centimeters). In some cases, the computing system may add noise to initial operations to generate the operations. The computing system may add the one or more noisy training objects to the plurality of training objects. Therefore, the computing system can account for noise in implementing the operation.

In some cases, the computing system may not determine that the object corresponds to a particular training object. Instead, the computing system may identify the object. Further, the computing system may determine that the identified object corresponds to a particular operation (e.g., a climbing operation) based on association data linking a characteristic of the object and/or one or more robot parameters to the operation.

In some cases, the computing system may determine that the object corresponds to a particular scalable obstacle and may instruct the robot to scale the object based on determining that the object corresponds to a particular scalable obstacle of a plurality of scalable obstacles.

At block 608, the computing system identifies an operation (e.g., a climbing operation). The computing system may identify the operation based on determining that the object corresponds to the training object. For example, all or a portion of the plurality of training objects may be associated with (e.g., linked to) a particular operation of a plurality of operations based on association data. The association data may associate a particular operation with a particular characteristic of a training object and one or more robot parameters (e.g., reflecting an initial state of the robot). Further, the association data may include a set of policies. All or a portion of the set of policies may link a particular operation of the plurality of operations to a particular training object of the plurality of training objects (e.g., a particular characteristic) and one or more robot parameters.

To build the association data, the computing system may implement a machine learning model (e.g., a neural network). The machine learning model may provide (and may be trained to provide using the plurality of training objects) a particular operation based on an input of a training object (e.g., a characteristic of the training object) and/or robot parameter(s). In some embodiments, the computing system may identify an updated plurality of training objects and retrain the machine learning model using the updated plurality of training objects (periodically or aperiodically).

Further, the computing system may utilize reinforcement learning to simulate climbing of a training object by a simulated robot based on robot parameters and a characteristic of the training object. The computing system may determine a particular operation based on the simulation and may generate association data associating the operation with particular robot parameters and/or a particular characteristic.

The computing system may determine the plurality of operations. For example, the computing system may determine the plurality of operations using a controller (e.g., a model predictive controller, a joint controller, etc.). The computing system may determine the plurality of operations based on an input of one or more of joint positions, joint commands (e.g., joint torque commands), forces, and/or movements. The computing system may build all or a portion of the plurality of operations as a combination of sub-operations.

Further, the computing system may determine the particular operation based on the association data. For example, the controller may identify (e.g. build) the operation based on a characteristic (e.g., a height) of the object and one or more robot parameters (e.g., one or more joint commands, one or more forces, a foot placement location, a pose, an orientation, a leg placement location, a state of the robot, etc.). In some cases, the controller may select the operation from the plurality of operations based on the association data. In some embodiments, the computing system may provide the input of one or more of joint positions, joint commands (e.g., joint torque commands), forces, and/or movements directly to one or more joint controllers.

All or a portion of the plurality of operations may include one or more sub-operations. All or a portion of the sub-operations may be associated with robot parameters identifying parameters to cause the robot to execute a particular sub-operation. For example, the robot parameters may include one or more of a respective foot placement location for one or more feet of the robot, a respective foot placement timing for one or more feet of the robot, a respective force at one or more feet of the robot, a respective pose for the robot, a respective orientation for the robot, a respective leg placement location for one or more legs of the robot, a leg placement timing for one or more legs of the robot, a placement location for a non-foot portion of one or more legs of the robot, a placement timing for a non-foot portion of one or more legs of the robot, a foot movement, a leg movement, a body movement, etc. In some cases, the non-foot portion of the one or more legs may be a portion of the one or more legs that does not contact a ground surface during traversal of an environment by the robot (e.g., walking in the environment). In some cases, the non-foot portion of the one or more legs may be a non-horizontal portion of the one or more legs (e.g., a vertical portion, a diagonal portion, etc.). For example, the non-foot portion of the one or more legs may not be parallel with the ground surface (e.g., may be perpendicular to the ground surface, may be diagonal to the ground surface, etc.) when the robot is walking or standing on the ground surface.

In some embodiments, the operation may cause the robot to balance on one or more feet (e.g., the feet of the two rear legs of the robot) for a particular period of time. For example, the operation may cause the robot to dynamically balance. The operation may cause the robot to balance on one or more feet (e.g., the two rear feet) as one or more other feet (e.g., the two front feet) are placed on the object or are in the air (e.g., not placed on the surface or the object).

At block 610, the computing system instructs the robot to perform the operation. For example, the computing system may instruct the robot to traverse (e.g., climb, climb on, climb over, scale, etc.). In some cases, the computing system may instruct the robot to traverse the object using one or more legs of the robot based on the operation. For example, the computing system may instruct movement of a distal end of one or more legs of the robot to interact with the object according to the operation.

To instruct the robot to perform the operation, the computing system may instruct the robot to shift a position of one or more legs (e.g., one or more rear legs) of the robot (e.g., a four-legged robot having two rear legs and two front legs) relative to the object (e.g., shift the one or more rear legs closer to the object). The computing system may instruct the robot to provide a downward force via one or more of the two rear legs and/or the two front legs. The computing system may instruct the robot to flex the two rear legs and/or extend two rear legs. Further, the computing system may instruct the robot to flex the two front legs and place one or more (e.g., at least two) of the legs (e.g., one or more of the front legs) on the object and shift a weight distribution of the robot. For example, the computing system may instruct the robot to place a rear shank portion of a first front leg and a rear shank portion of a second front leg on the object. The computing system may instruct the robot to extend the two front legs, flex the two rear legs, and place the two rear legs on the object.

In some cases, the computing system may instruct display of a user interface on a user computing device. The user interface may reflect a virtual representation of the object and/or the robot. The computing system may obtain instruction(s) to climb the object based on the user interface and may instruct the robot to perform the operation based on the instruction(s).

In some embodiments, the computing system may identify (iteratively or simultaneously) a second object. For example, the computing system may receive second sensor data of the environment from the one or more sensors of the robot. Further, the computing system may identify a second object in the environment based on the second sensor data. The computing system may determine that the second object corresponds to a second training object of the plurality of training objects based on a second characteristic of the second object. In some cases, the second characteristic and the characteristic may be the same or different characteristics. The computing system may identify a second operation from the plurality of operations for the robot based on determining that the second object corresponds to the second training object. In some cases, the second operation and the operation may be the same or different operations. The computing system may instruct the robot to traverse (e.g., climb on) the second object based on the second operation.

In some cases, the computing system may determine that the second object does not correspond to a training object of the plurality of training objects based on the second characteristic of the second object. Further, the computing system may determine that the robot cannot climb on the second object based on determining that the second object does not correspond to a training object of the plurality of training objects. The computing system may instruct display of a user interface on a user computing device. The user interface may include information indicating that the robot cannot climb on the second object and/or may reflect a virtual representation of the robot and/or the second object. In some cases, the computing system may retrain the machine learning model utilizing the second object based on determining the plurality of training objects does not include a training object corresponding to the second object.

In some embodiments, the computing system may utilize a first controller of the robot to instruct the robot to perform the operation and a second controller of the robot for stair navigation.

Figure 7:
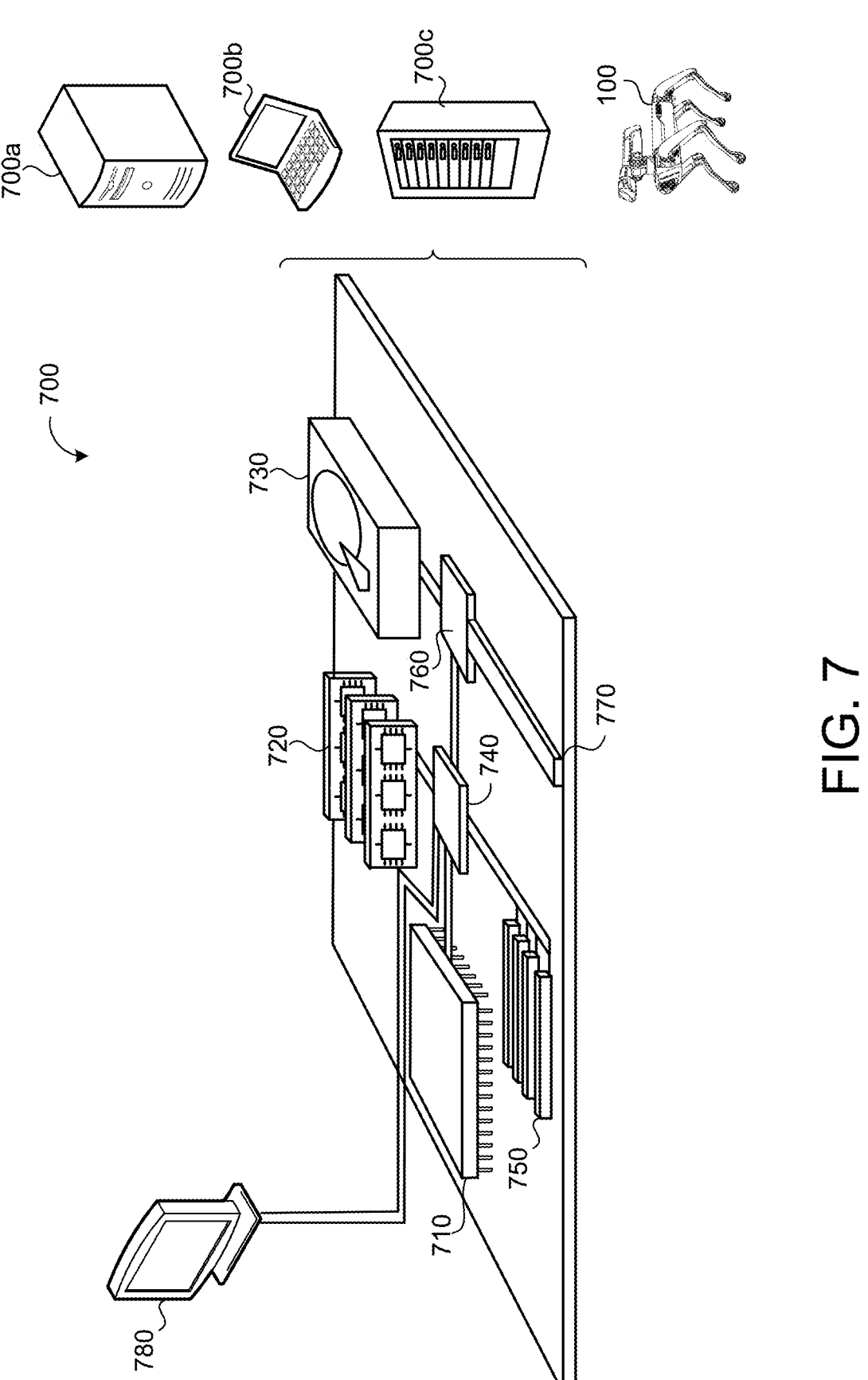
FIG. 7 is a schematic view of an example computing device that may be used to implement the systems and the methods described herein.

FIG. 7 is schematic view of an example computing device 700 that may be used to implement the systems (e.g., the maneuver controller 200) and methods (e.g., the method 300) described in this document. The computing device 700 is intended to represent various forms of digital computers, such as laptops, desktops, workstations, personal digital assistants, servers, blade servers, mainframes, and other appropriate computers. The components shown, their connections and relationships, and their functions, are meant to be exemplary only, and are not meant to limit implementations of the inventions described and/or claimed in this document.

The computing device 700 includes a processor 710 (e.g., data processing hardware), memory 720 (e.g., memory hardware), a storage device 730, a high-speed interface/controller 740 connecting to the memory 720 and high-speed expansion ports 750, and a low-speed interface/controller 760 connecting to a low-speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high-speed interface/controller 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high-speed interface/controller 740 manages bandwidth-intensive operations for the computing device 700, while the low-speed interface/controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed interface/controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, as part of a rack server system 700c, or as part of a robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. A processor may receive instructions and data from a read only memory or a random access memory or both. The essential elements of a computer may be a processor for performing instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a robot, sensor data of an environment of the robot from one or more sensors of the robot;
identifying, by the data processing hardware, an object in the environment based on the sensor data;
determining, by the data processing hardware, that a characteristic of the object identified in the environment corresponds to a characteristic of a simulated training object of a plurality of simulated training objects generated by a simulation system;
identifying, by the data processing hardware, a climbing operation from a plurality of climbing operations for the robot based on determining that the characteristic of the object identified in the environment corresponds to the characteristic of the simulated training object, wherein each of the plurality of simulated training objects is associated with a respective climbing operation of the plurality of climbing operations; and
instructing, by the data processing hardware, the robot to climb on the object identified in the environment based on the climbing operation.

2. The method of claim 1, wherein each of the plurality of climbing operations is associated with one or more of:
a respective foot placement location for one or more feet of the robot;
a respective foot placement timing for one or more feet of the robot;
a respective force at one or more feet of the robot;
a respective pose for the robot;
a respective orientation for the robot;
a respective leg placement location for one or more legs of the robot;
a respective leg placement timing for one or more legs of the robot;
a placement location for a non-foot portion of one or more legs of the robot; or
a placement timing for a non-foot portion of one or more legs of the robot.

3. The method of claim 1, further comprising instructing the robot to balance on two feet of the robot based on the climbing operation.

4. The method of claim 1, further comprising determining the plurality of climbing operations using a controller, wherein the controller is configured to determine a respective climbing operation of the plurality of climbing operations based on one or more of:
an input to the controller;
a joint position; or
a joint torque command.

44

5. The method of claim 1, further comprising determining the plurality of climbing operations using a controller, wherein the controller is configured to determine a respective climbing operation of the plurality of climbing operations based on an input to the controller, wherein the input to the controller comprises one or more of:
a respective foot placement location for one or more feet of the robot;
a respective pose for the robot;
a respective orientation for the robot;
a respective leg placement location for one or more legs of the robot;
the characteristic of the object identified in the environment;
a height of the object identified in the environment; or
a state of the robot.

6. The method of claim 1, further comprising:
receiving second sensor data of the environment from the one or more sensors of the robot;
identifying a second object in the environment based on the second sensor data;
determining that a characteristic of the second object identified in the environment corresponds to a characteristic of a second simulated training object of the plurality of simulated training objects, wherein the characteristic of the second object identified in the environment and the characteristic of the object identified in the environment are different characteristics;
identifying a second climbing operation from the plurality of climbing operations for the robot based on determining that the characteristic of the second object identified in the environment corresponds to the characteristic of the second simulated training object, wherein the second climbing operation and the climbing operation are different climbing operations; and
instructing the robot to climb on the second object identified in the environment based on the second climbing operation.

7. The method of claim 1, further comprising:
receiving second sensor data of the environment from the one or more sensors of the robot;
identifying a second object in the environment based on the second sensor data;
determining that a characteristic of the second object identified in the environment does not correspond to a characteristic of a respective simulated training object of the plurality of simulated training objects;
determining that the robot cannot climb on the second object identified in the environment based on determining that the characteristic of the second object identified in the environment does not correspond to a characteristic of a respective simulated training object of the plurality of simulated training objects; and
causing display of a user interface at a user computing device, wherein the user interface includes information indicating that the robot cannot climb on the second object identified in the environment and reflects a virtual representation of one or more of the robot or the second object identified in the environment.

8. The method of claim 1, wherein the characteristic of the object identified in the environment comprises one or more of:
a height of the object identified in the environment; or
information indicating that the object identified in the environment comprises a vehicle.

9. The method of claim 1, further comprising:

determining that one or more of the robot or the sensor data is associated with noise;

adjusting the characteristic of the simulated training object based on the noise to generate a noisy simulated training object; and adding the noisy simulated training object to the plurality of simulated training objects.

10. The method of claim 1, wherein the plurality of simulated training objects is associated with a plurality of characteristics, the plurality of characteristics comprising a plurality of heights.

11. The method of claim 1, wherein the plurality of simulated training objects comprises one or more of a vehicle, a trailer, a box, a platform, a rock wall, or a stage.

12. The method of claim 1, wherein the robot comprises two front legs and two rear legs, wherein each of the two front legs have a rear shank portion, wherein instructing the robot to climb on the object identified in the environment comprises:

instructing the robot to place a rear shank portion of a first front leg of the two front legs and a rear shank portion of a second front leg of the two front legs on the object identified in the environment.

13. The method of claim 1, wherein the robot comprises two front legs and two rear legs, wherein instructing the robot to climb on the object identified in the environment comprises:

instructing the robot to shift a position of the two rear legs relative to the object identified in the environment;

instructing the robot to provide a downward force via one or more of the two rear legs or the two front legs;

instructing the robot to place the two front legs on the object identified in the environment; and shifting a weight distribution of the robot.

14. The method of claim 1, wherein the robot comprises two front legs and two rear legs, wherein instructing the robot to climb on the object identified in the environment comprises:

instructing the robot to flex the two rear legs;

instructing the robot to extend the two rear legs;

instructing the robot to flex the two front legs and place the two front legs on the object identified in the environment;

instructing the robot to extend the two front legs; and instructing the robot to flex the two rear legs and place the two rear legs on the object identified in the environment.

15. The method of claim 1, wherein instructing the robot to climb on the object identified in the environment based on the climbing operation comprises instructing the robot, using a first controller of the robot, to climb on the object identified in the environment, wherein the robot is configured to utilize a second controller of the robot for stair navigation.

16. The method of claim 1, wherein determining that the characteristic of the object identified in the environment corresponds to the characteristic of the simulated training object comprises one or more of:

determining that the characteristic of the object identified in the environment matches the characteristic of the simulated training object;

determining that the characteristic of the object identified in the environment is within a particular degree of similarity of the characteristic of the simulated training object; or determining that the characteristic of the object identified in the environment corresponds to the characteristic of the simulated training object further based on comparing the characteristic of the object identified in the environment to a respective characteristic of one or more simulated training objects of the plurality of simulated training objects.

17. The method of claim 1, wherein identifying the climbing operation comprises accessing a machine learning model, wherein the machine learning model is trained to output a particular climbing operation based on an input of a particular simulated training object, wherein the machine learning model is trained utilizing the plurality of simulated training objects, the method further comprising:

identifying an updated plurality of simulated training objects; and retraining the machine learning model utilizing the updated plurality of simulated training objects.

18. The method of claim 1, further comprising:

causing display of a user interface at a user computing device, wherein the user interface reflects a virtual representation of the object identified in the environment; and obtaining one or more instructions to climb the object identified in the environment based on the user interface, wherein instructing the robot to climb on the object identified in the environment is further based on the one or more instructions.

19. A robot comprising:

at least one sensor;

at least two legs;

data processing hardware in communication with the at least one sensor; and memory in communication with the data processing hardware, the memory storing instructions that when executed on the data processing hardware cause the data processing hardware to:

obtain sensor data captured from an environment by the at least one sensor;

identify an object in the environment based on the sensor data;

determine that the object identified in the environment corresponds to a simulated training object of a plurality of simulated training objects generated by a simulation system based on a characteristic of the object identified in the environment;

identify an operation from a plurality of operations based on determining that the object identified in the environment corresponds to the simulated training object, wherein each of the plurality of simulated training objects is associated with a respective operation of the plurality of operations; and instruct traversal of the object identified in the environment using the at least two legs based on the operation.

20. The robot of claim 19, wherein the operation indicates a series of iterative movements.

21. The robot of claim 19, wherein the operation indicates a respective series of iterative movements for each of the at least two legs.

22. The robot of claim 19, wherein execution of the instructions on the data processing hardware further causes the data processing hardware to:

determine that one or more of the robot or the sensor data is associated with noise; and generate the operation based on the noise.

23. The robot of claim 19, wherein to identify the operation, execution of the instructions on the data processing hardware further causes the data processing hardware to access a machine learning model, wherein the machine learning model is trained to output a particular operation based on an input of a particular simulated training object, wherein the machine learning model is trained utilizing the plurality of simulated training objects, wherein the execution of the instructions on the data processing hardware further causes the data processing hardware to:

identify a second object;

determine the plurality of simulated training objects does not comprise a particular simulated training object corresponding to the second object; and retrain the machine learning model utilizing the particular simulated training object corresponding to the second object based on determining the plurality of simulated training objects does not comprise the particular simulated training object corresponding to the second object.

24. The robot of claim 19, wherein execution of the instructions on the data processing hardware further causes the data processing hardware to:

access a set of policies, wherein each policy of the set of policies links a particular operation of the plurality of operations to a particular simulated training object of the plurality of simulated training objects, wherein identifying the operation is further based on the set of policies.

* * * * *